United States Patent [19]

Sunamura et al.

[11] Patent Number: 5,048,296

[45] Date of Patent: Sep. 17, 1991

[54] ANTI-VIBRATION APPARATUS IN A HYDRAULIC SYSTEM FOR BOOM CYLINDER OF WORKING APPARATUS

[75] Inventors: Kazuhiro Sunamura, Ibaraki; Osamu Tomikawa, Tsuchiura; Toichi Hirata, Ushiku, all of Japan

[73] Assignee: Hitachi Construction Co., Ltd., Tokyo, Japan

[21] Appl. No.: 463,300

[22] Filed: Jan. 9, 1990

[30] Foreign Application Priority Data

| | | | |
|---|---|---|---|
| Jan. 13, 1989 | [JP] | Japan | 1-007351 |
| Jan. 13, 1989 | [JP] | Japan | 1-007352 |
| Jan. 13, 1989 | [JP] | Japan | 1-007353 |

[51] Int. Cl.[5] .................. F16D 31/02

[52] U.S. Cl. .................. 60/468; 60/469; 60/492; 91/459

[58] Field of Search .................. 91/275, 361, 437, 440, 91/459, 449; 60/328, 329, 368, 469, 494, 468

[56] References Cited

U.S. PATENT DOCUMENTS

| | | | |
|---|---|---|---|
| 3,579,987 | 5/1971 | Busse | 60/368 |
| 4,586,332 | 5/1986 | Schexnayder | 60/468 |
| 4,718,329 | 1/1988 | Nakajema et al. | 91/459 |

FOREIGN PATENT DOCUMENTS

| | | | |
|---|---|---|---|
| 707161 | 4/1965 | Canada | 60/469 |
| 139503 | 10/1980 | Japan | 91/437 |
| 817330 | 3/1981 | U.S.S.R. | 91/437 |

*Primary Examiner*—Edward K. Look
*Assistant Examiner*—F. Daniel Lopez
*Attorney, Agent, or Firm*—Antonelli, Terry, Stout & Kraus

[57] ABSTRACT

A working machine such as a hydraulic excavator is provided with a working apparatus including a boom pivotally mounted on the body of the working apparatus and a boom-cylinder hydraulic system for the working apparatus. The hydraulic system includes an actuator for moving the boom up and down and a directional selecting valve. The directional selecting valve is arranged to effect selective switching of the feed of a pressurized working fluid to and the discharge of the working fluid from with respect to the rod-side and the bottom-side hydraulic chamber. The hydraulic system further includes a device for relieving the pressure of the bottom-side hydraulic chamber of the actuator. This relieving device is connected to the bottom-side hydraulic chamber of the actuator via a hydraulic circuit. When the pressure in the bottom-side hydraulic chamber changes from rise to fall, the pressure is released to a low-pressure side of the hydraulic circuit, thereby suppressing oscillation of the boom.

20 Claims, 20 Drawing Sheets

ANTI-VIBRATION APPARATUS IN A HYDRAULIC SYSTEM FOR BOOM CYLINDER OF WORKING APPARATUS

BACKGROUND OF THE INVENTION

The present invention relates to an improvement in a hydraulic system for the boom cylinder of a working apparatus. The improved hydraulic system is suitable for use in, but not limited to, a construction machine such as a hydraulic excavator.

A construction machine such as a hydraulic excavator is commonly arranged to effect a desired work by activating a working apparatus which is operatively mounted on the body of the machine. Such a working apparatus generally has a large inertia since it is strongly made so as to endure heavy use and large load. For this reason, each time the working apparatus is actuated and stopped, it is oscillated or swung due to a large inertial force. The oscillation or swinging motion of the working apparatus affects working efficiency and operability such as ease of accurate positioning of the working apparatus. In addition, such oscillation may cause wear of moving parts to adversely affect the lifetime of the construction machine.

To suppress the above-described oscillation, for example, Japanese Patent Unexamined Publication Nos. 63-138024 and 63-40026 teach that a driving system is controlled, in accordance with the operating position of the control lever of a hydraulic excavator, so as to feed hydraulic fluid to a boom cylinder in a direction in which the oscillation of the boom is prevented. Either of the proposed oscillation-suppressing devices is arranged to execute the above control only when the control lever is placed at an operating position not beyond a predetermined reference position in order to prevent the progression of working from being hindered due to a discrepancy between the operational sensation of an operator and the operating speed of the working apparatus or the behavior of the working apparatus when stopping. That is, the above described control is not effected within an operational range substantially corresponding to the normal working of the machine.

SUMMARY OF THE INVENTION

It is a object of the present invention to provide a hydraulic system for the boom cylinder of a working apparatus which can reliably prevent oscillation of a boom to improve working efficiency and the lifetime of the working apparatus.

It is another object of the present invention to provide a hydraulic system for the boom cylinder of a working apparatus which can reliably prevent oscillation of a boom by means of a simple device to accurately position the boom.

As will be described in detail later, the present invention is based on the result of an analysis of the behavior of the boom during oscillation that, when the boom is abruptly stopped during a downward movement, a large pressure variation is caused in the hydraulic system due to the inertial force of the working apparatus. The present invention is intended to prevent oscillation of the boom by eliminating such a pressure variation.

In accordance with the present invention, there is provided a hydraulic system for a boom cylinder in a working apparatus which includes a boom mounted pivotally with respect to the body of the working apparatus. The hydraulic system has an actuator for moving the boom up and down, which actuator includes a piston rod connected to the boom and a cylinder defining a rod-side hydraulic chamber and a bottom-side hydraulic chamber for extending or retracting the piston rod, and a hydraulic circuit including a directional selecting valve and lines for respectively connecting the rod-side and bottom-side hydraulic chambers with the directional selecting valve, which valve selectively switches over the feed and draining of pressurized working fluid with respect to the rod-side and the bottom-side chamber. The hydraulic system further comprises a device connected to the bottom-side hydraulic chamber of the actuator through the hydraulic circuit for relieving a pressure in the bottom-side hydraulic chamber to a low-pressure side of the hydraulic circuit at the instant when the pressure changes from increment to decrement.

If the boom is abruptly stopped during a downward movement, the working liquid in the bottom-side hydraulic chamber of the actuator is temporarily pressurized due to the inertia of the boom, and then forces the boom upward by its pressing force. In the aforesaid arrangement, at the instant when the pressure in the bottom-side hydraulic chamber changes from rise to fall, the pressure in the bottom-side hydraulic chamber is relieved and is therefore abruptly reduced. As a result, the boom is halted and the oscillation thereof is effectively prevented.

The pressure in the bottom-side hydraulic chamber may be released into the line leading to the rod-side hydraulic chamber of the actuator or into a tank or an accumulator which constitutes the hydraulic circuit.

Preferably, a device for detecting whether or not the directional selecting valve is placed in its neutral position may be provided so as to relieve the pressure when the directional selecting valve is returned to the neutral position and the pressure in the bottomside hydraulic chamber changes from rise to fall.

The device for relieving the pressure of the bottom-side hydraulic chamber may be a valve which is adapted to be directly exposed to the exposure to form a hydraulic channel, or a combination of a solenoid valve and a sensor for detecting the pressure in the bottom-side hydraulic chamber. Alternatively, the pressure in the bottom-side hydraulic chamber may be relieved by detecting the displacement of the boom which represents the pressure of the bottom-side hydraulic chamber, the operational position of the directional selecting valve, or the like.

BRIEF DESCRIPTION OF THE DRAWINGS

The above and other objects, features and advantages of the present invention will become apparent from the following detailed description which will be made with reference to the accompanying drawings, in which.

DESCRIPTION OF THE PREFERRED EMBODIMENTS

Figure 1:
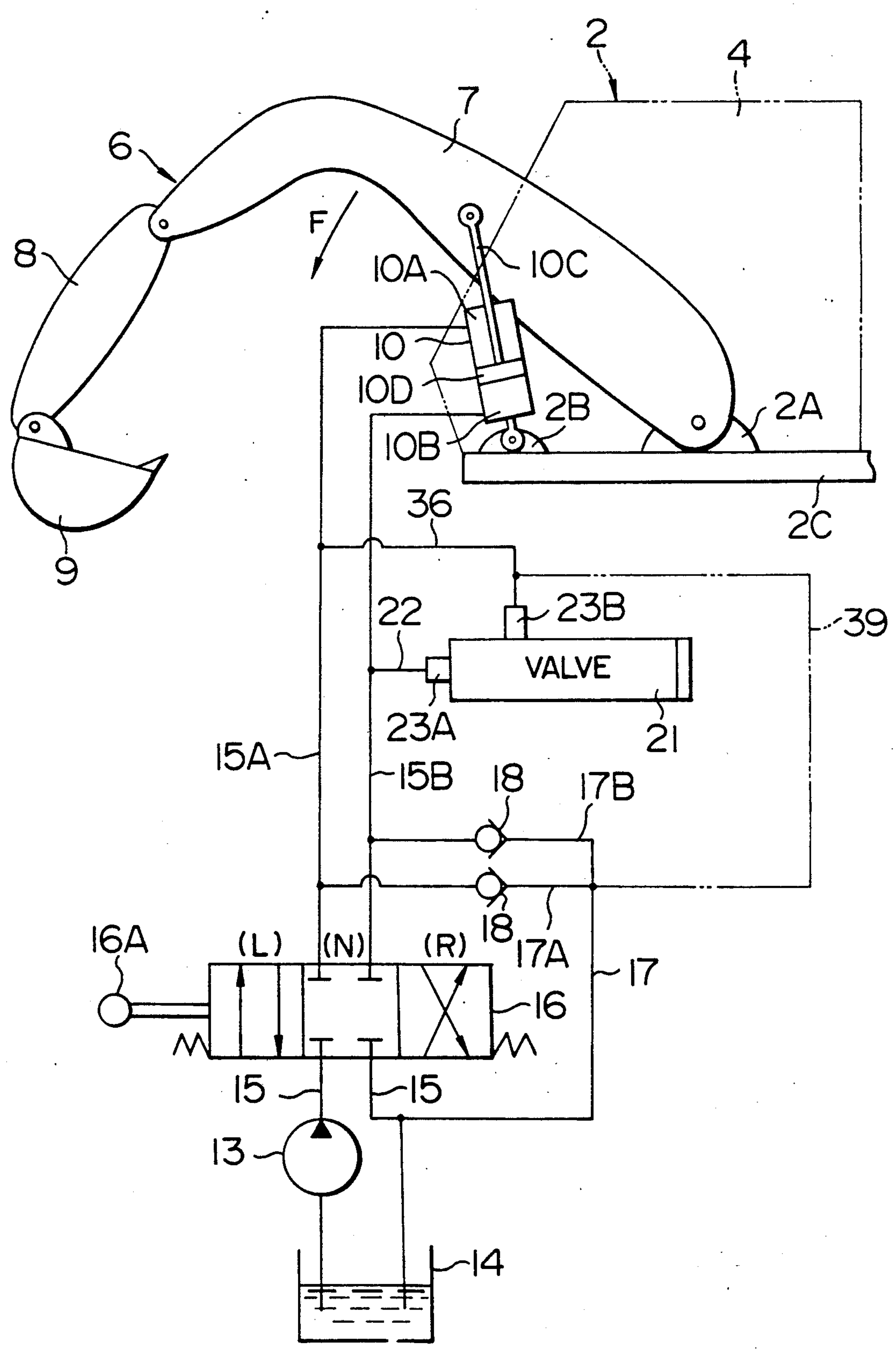
FIG. 1 is a schematic diagram showing a hydraulic system for a boom cylinder according to a first embodiment of the present invention.

Prior to explaining the embodiments of the present invention, the overall construction of a hydraulic system for the boom cylinder of a working apparatus to which the present invention is applicable, is explained with reference to FIGS. 19 to 21B.

In the figures, reference numeral 1 denotes a lower traveling structure or body of the hydraulic excavtor, and reference numeral 2 denotes an upper swinging structure or body which is mounted on the lower traveling body 1 for swinging motion. The swinging structure 2 constitutes, in combination with the traveling structure 1, the body of the working machine. The swinging structure 2 is provided with a swinging frame 2C which constitutes a framework structure in combination with brackets 2A and 2B shown in FIG. 20. In the swinging structure 2, a machine house 3, a cage 4 and a counterweight 5 are provided at positions on the swinging frame 2c.

Figure 20:
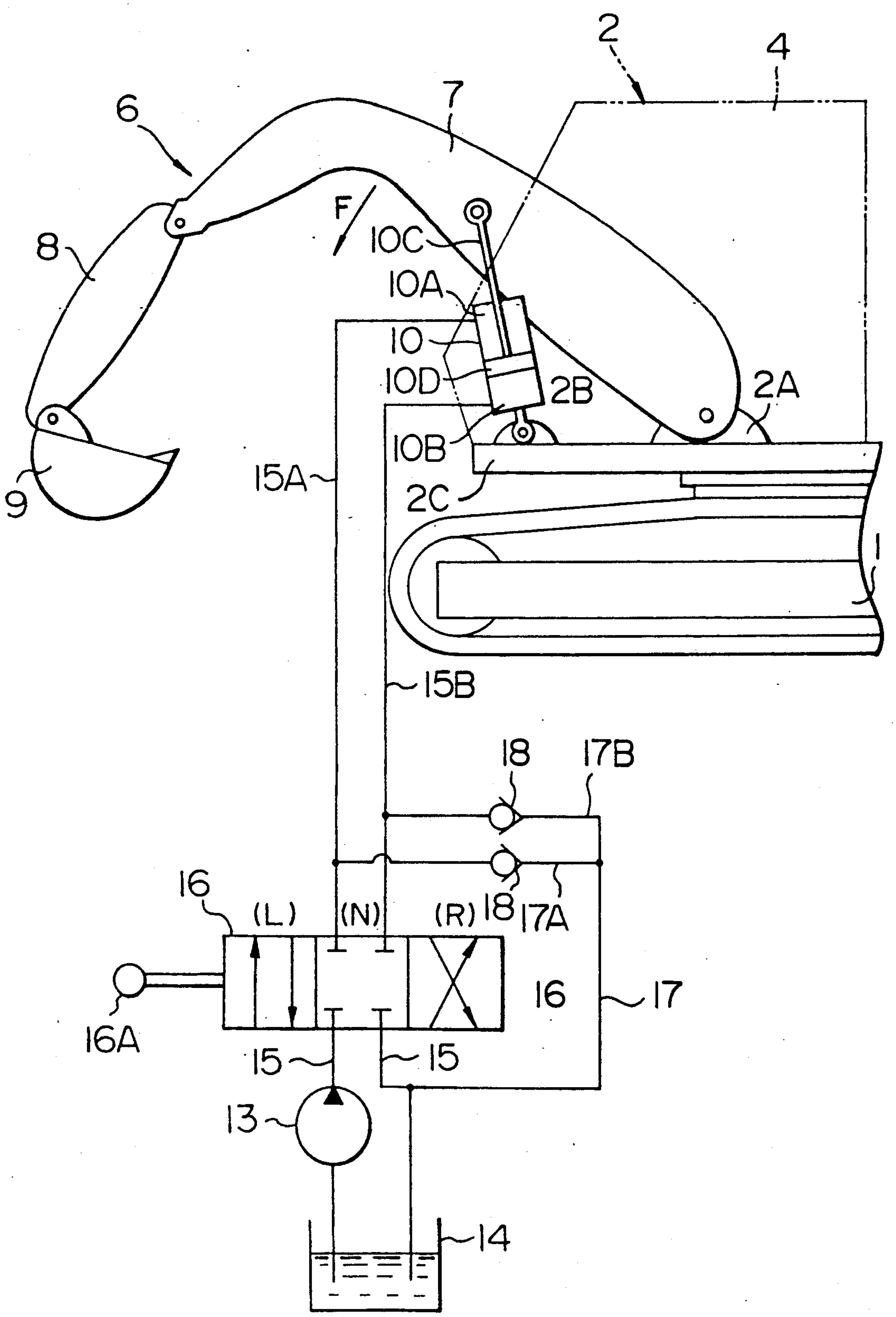
FIG. 20 is a schematic diagram showing a hydraulic system for the boom cylinder of a working apparatus in the hydraulic excavtor of FIG. 19.

Reference numeral 6 denotes a working apparatus, which is disposed at the front of the swinging structure 2 so that it can swing up and down. The working apparatus 6 is, as shown in FIG. 20, provided with a boom 7 which is pin-connected to the bracket 2A so that it can swing up and down, an arm 8 which is rotatably pin-connected to the front end of the boom 7, and a bucket 9 which is rotatably pin-connected to the front end of the arm 8, the bucket 9 serving as a working tool. A boom cylinder 10 is rotatably provided between the boom 7 and the bracket 2B so as to swing the boom 7 up and down. The boom cylinder 10 is, as shown in FIG. 20, provided with a rod-side hydraulic chamber 10A and a bottom-side hydraulic chamber 10B. The working apparatus 6 further includes an arm cylinder 11 for rotating the arm 8 and a bucket cylinder 12 for rotating the bucket 9.

Next, a hydraulic circuit for the boom cylinder 10 will be described below with reference to FIG. 20.

In the figure, reference numeral 13 denotes a hydraulic pump which is provided in the machine house 3 and constitutes a hydraulic source in cooperation with a tank 14, and reference numerals 15, 15 denote a pair of main pipe lines which connect the hydraulic pump 13, the tank 14 and the boom cylinder 10 with one another. The main lines 15 include a rod-side line 15A and a bottom-side line 15B. The rod-side line 15A connects one port of a directional selecting valve 16 which will be described later to the rod-side hydraulic chamber 10A of the boom cylinder 10, while the bottom-side line 15B connects another port of the directional selecting valve 16 to the bottom-side hydraulic chamber 10B.

The directional selecting valve 16 is provided midway of the main lines 15. By manually operating a operating lever 16 provided in the cage 4, the directional selecting valve 16 is switched from its neutral position N to its left-switched position L or right-switched position R, so as to feed hydraulic fluid from the hydraulic pump 13 to and allow hydraulic fluid to be drained from the rod-side hydraulic chamber 10A and the bottom-side hydraulic chamber 10B of the boom cylinder 10 or vice versa. Reference numeral 7 denotes a tank line which branches from the aforesaid lines 15A and 15B and is connected to the circuit on the tank 14 side thereof, and reference numerals 18, 18 denote check valves which are provided as supplementary valves midway along lines 15A and 15B, respectively. When the pressure within either of the lines 17A and 17B falls below the tank pressure, the corresponding check valve 18 opens to supply a hydraulic liquid from the tank 14 to the line 15A or 15B, thereby preventing the pressure in the lines 15A and 15B from going negative.

In the working apparatus which is arranged in the above-described manner, when the operating lever 16A is manually operated to switch the directional selecting valve 16 from its neutral position N to its left-switched position L, hydraulic fluid is supplied from the hydraulic pump 13 to the rod-side hydraulic chamber 10A of the boom cylinder 10. Simultaneously, the hydraulic fluid in the bottom-side hydraulic chamber 10B is discharged into the tank 14 so that a rod 10C is moved into the boom cylinder 10 to rotate the boom 7 in the downward direction. If the directional selecting valve 16 is switched to the right-switched position R, hydraulic fluid is supplied from the hydraulic pump 13 to the bottom-side hydraulic chamber 10B. Simultaneously, the hydraulic fluid in the rod-side hydraulic chamber 10A is discharged into the tank 14 so that the rod 10C is moved out of the boom cylinder 10 to rotate the boom 7 in the upward direction. when the directional selecting valve 16 is returned to the neutral position N, the supply of hydraulic fluid from the hydraulic pump 13 stops so that the boom cylinder 10, hence the boom 7, also stops.

The present inventors have found the following problems in the working apparatus having the abovedescribed arrangement and construction.

In the aforesaid working apparatus, there is a case where, while the boom 7 is being rapidly moved in the downward direction by the operation of the boom cylinder 10, the directional selecting valve 16 is abruptly returned to the the neutral position N to stop the boom cylinder 10. In such a case, an inertial force F, which is derived from the total weight of the working apparatus 6 including the arm 8, the bucket 9 and so on, acts on the boom 7 in the direction indicated by arrow F in FIG. 20. Accordingly, the hydraulic fluid charged in the bottom-side hydraulic chamber 10B of the boom cylinder 10 is subjected to a temporary compression action due to the inertial force F. As a result, as shown by a characteristic line 19 in FIG. 21A, the pressure in the bottom-side hydraulic chamber 10B abruptly rises between points A and B. The rod 10C and a piston 10D in the boom cylinder 10 are forced upward by the raised pressure, and then the pressure in the bottom-side hydraulic chamber 10B thereby falls. Thus, the pressure in the bottom-side hydraulic chamber 10B gradually attenuates, repeatedly rising and falling as shown by the characteristic line 19 due to the influence of the total weight of the working apparatus 6.

Figure 21A:
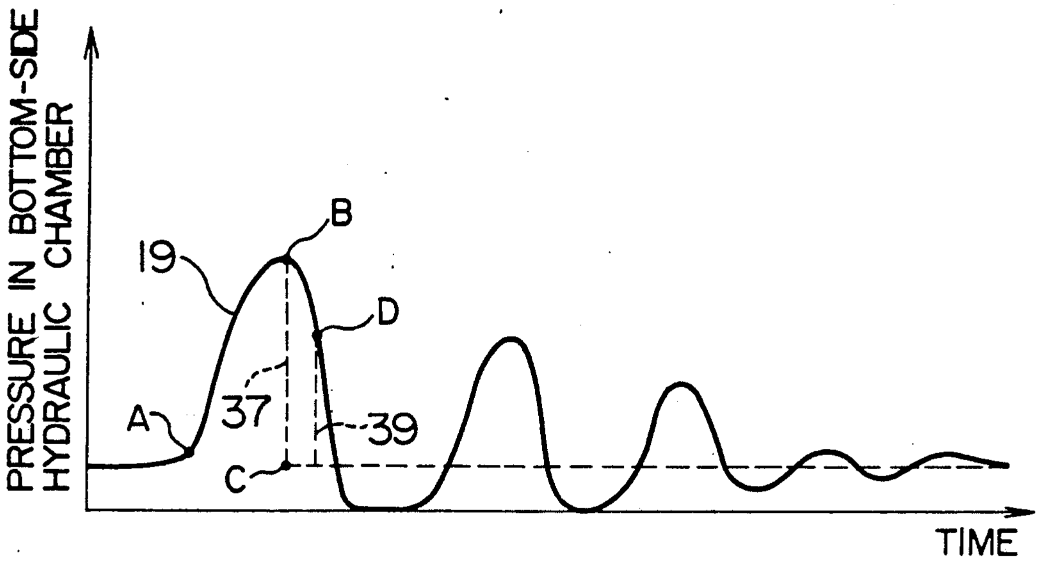
FIGS. 21A and 21B are charts respectively showing the pressure variation which occurs in the bottom-side hydraulic chamber of the boom cylinder and the displacement of the boom cylinder when the boom is stopped during its rapid downward movement.
Figure 21B:
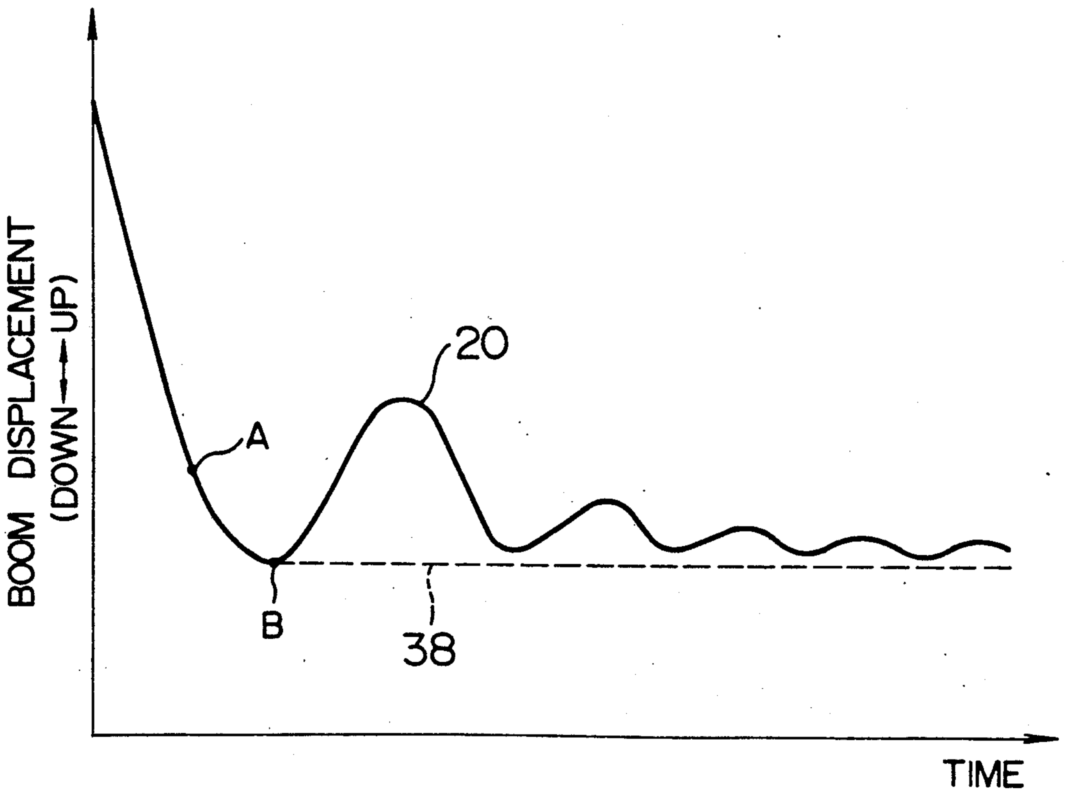

Consequently, if the boom 7 is stopped during its rapid downward motion, it repeatedly swings up and down as shown by a characteristic line 20 in FIG. 21B, and extra vibrations are thereby transmitted to the boom 7, the boom cylinder 10 and so on. For this reason, the working apparatus described above has the following problems: connecting pins or the like may wear rapidly and, since the bucket 9 or the like cannot be rapidly positioned, the working efficiency deteriorates.

The present invention has been made in light of the above-described problems and is intended to prevent boom oscillation by relieving bottom-side pressure, which causes boom oscillation, into the low-pressure side.

The embodiments of the present invention will be explained below with reference to FIGS. 1 through 18. In the following description as to the specific embodiments, the same reference numerals are used to denote the same elements as those used in the working apparatus explained in connection with FIGS. 19 and 20, and no explanation is given of these elements.

Figure 2:
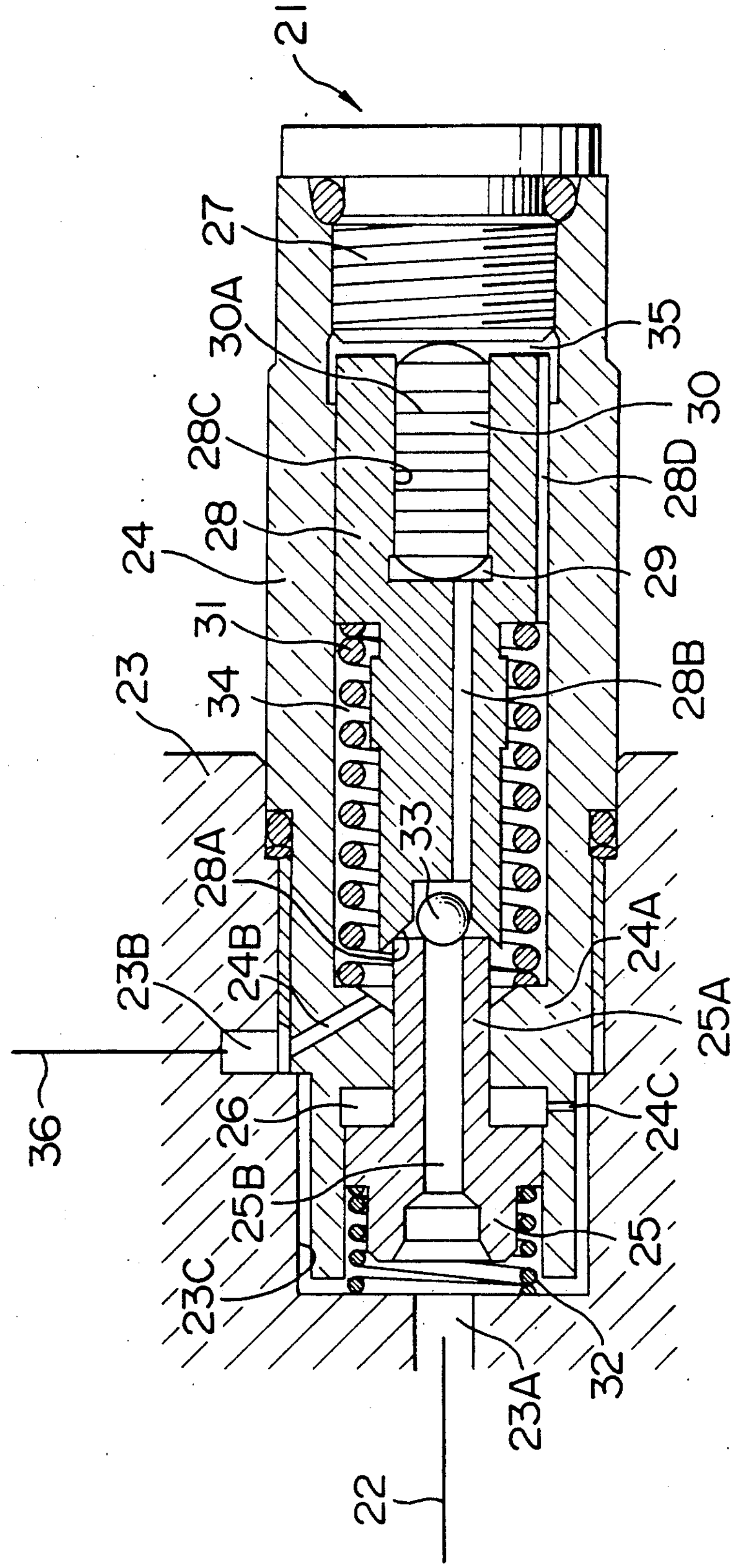
FIG. 2 is a diagrammatic cross-sectional view showing the oscillation-preventing valve used in the system of FIG. 1.

FIGS. 1 and 2 show a first embodiment of the present invention.

As illustrated, reference numeral 2 denotes an oscillation-preventing valve which is connected via a line 22 to an intermediate point of the bottom-side line 15B which connects the bottom-side hydraulic chamber 10B of the boom cylinder 10 and a corresponding port of the directional selecting valve 16. As shown in FIG. 2, the oscillation-preventing valve 21 has a casing 23 provided with a valve-mounting cavity 23C which communicates with inlet and outlet ports 23A and 23B, and a valve body 24 which is screwed into the valve-mounting cavity 23C and which is formed into a stepped cylinder. Disposed in the valve body 24, are a valve member 25 of a stepped cylindrical configuration and a lid member 27 which closes the proximal end of the valve body 24.

The valve member 25 has a small-diameter portion 25A, which is slidably inserted through an annular stepped portion 24A to define an oil reservoir 26 between the annular stepped portion 24A and the valve member 25A. A plunger 28 is also slidably inserted into the valve body 24 at an intermediate location between the lid member 27 and the valve member 25. The distal end of the plunger 28 is formed into a valve seat 28A for receiving the valve member 25, while the proximal end portion is provided with a piston sliding bore 28C communicating with the interior of the valve seat 28A via an oil channel 28B. A command piston 30 is slidably inserted into the piston-sliding bore 28C of the plunger 28, and the distal end of the command piston 30 defines a pressure chamber 29 in cooperation with the piston-sliding cavity 28C, and the proximal end adjoins the lid member 27. A setting spring 31 is held in compression between the annular stepped portion 24A of the valve body 24 and the plunger 28 so as to consistently urge the plunger 28 toward the lid member 27 with a predetermined very high set pressure. Also, a weak spring 32 is held in compression between the valve 25 and the bottom of the valve-mounting cavity 23C of the casing 23 so as to consistently urge the valve member 25 toward the valve seat 28A of the polunger 28. An axial bore 25B extends through the valve member 25, and a valve ball 33 is disposed in the valve seat 28A of the plunger 28 so that it can roll toward and away from the corresponding end of the axial bore 25B. The valve ball 33 serves as a check valve which allows hydraulic fluid to flow from the axial bore 25B to an oil channel 28B in the plunger 28 and which inhibits the reversal of oil flow.

In the valve body 24, the portion which includes the setting spring 31 is formed as a spring chamber 34. The spring chamber 34 consistently communicates with an oil chamber 35 defined between the plunger 28 and the lid member 27 through an oil groove 28D formed across the outer periphery of the plunger 28. In addition, the spring chamber 34 consistently communicates with the port 23B through an oil channel 24B which is formed in the annular stepped portion 24A. The port 23A is, as shown in FIG. 1, connected to the bottom-side line 15B via the line 22 shown in FIG. 1, while the port 23B is connected to the rod-side line 15A via a line 36. The above pressure chamber 29 is formed to have an effective cross-sectional area larger than the small-diameter portion 25A of the valve member 25. Accordingly, if the pressure of the hydraulic fluid supplied from the line 22 into the pressure chamber 29 through the axial bore 24B and the oil channel 28B, exceeds the set pressure of the setting spring 31, the command piston 30 is pressed against the lid member 27 by that pressure. The resulting reaction force causes the plunger 28 and the valve member 25 to slide toward the port 23A (to the left in FIG. 2) against the urging force of the setting spring 31.

A restriction channel 24C is formed in the valve body 24 to provide communication between the valve mounting bore 23C and the oil reservoir 26. The restriction channel 24C serves to supply hydraulic fluid from the port 23A to the oil reservoir 26 when the valve member 25 slides toward the port 23A, whereas when the valve member 25 is sliding toward the plunger 28, the restriction channel 24C little by little discharges the pressure oil (hydraulic liquid) from the oil reservoir 26 to the valve-mounting bore 23C by its restriction action. In this manner, the sliding motion of the valve member 25 is delayed with respect to that of the plunger 28. Also, a plurality of circumferential grooves 30A are formed around the outer periphery of the command piston 30. These circumferential grooves 30A utilize a labyrinth effect to prevent the hydraulic liquid in the pressure chamber 29 from leaking into the oil chamber 35.

The hydraulic circuit for a boom cylinder according to the first embodiment has the arrangement and construction described above. The following is an explanation of the action of the oscillation-preventing valve 21 to prevent oscillation of the boom 7.

While the boom 7 is being rapidly moved downward by switching the directional selecting valve 16 to its switched position L, if the directional selecting valve 16 is abruptly returned to the neutral position N, the large inertial force F acts on the boom 7 and, as described above, the hydraulic fluid charged in the bottom-side hydraulic chamber 10B of the boom cylinder 10 is exposed to a temporary compression action due to the inertial force F. As a result, as shown by the characteristic line 19 in FIG. 21A, the bottom-side pressure in the bottom-side line 15B abruptly rises between points A and B, similarly to the pressure in the bottom-side hydraulic chamber 10B. This bottom-side pressure acts on the pressure in the pressure chamber 29 through the line 22, the port 23A, the axial bore 25B and the oil channel 28B. The plunger 28 and the valve member 25 are thereby caused to slide toward the port 23A (to the left in FIG. 2) against the urging force of the setting spring 31.

At the instant when the bottom-side pressure changes from rise to fall at point B shown in FIG. 21A, the pressure acting on the pressure chamber 29 also falls. Accordingly, the plunger 28 is abruptly returned toward the lid member 27 (to the right in FIG. 2) by the urging force of the setting spring 31. However, since a time delay occurs while the hydraulic liquid in the oil reservoir 26 flows out through the restriction channel 24c, the valve member 25 does not immediately return and is forced to move to the right little by little by the weak spring 32. The end of the small-diameter portion 25A of the valve member 25 is separated from the valve seat 28A of the plunger 28. Thereby, the aforesaid bottomside pressure is released into the rod-side line 15A on the low-pressure side via the spring chamber 34, the oil chamber 24B, the port 23B and the line 36. In other words, the bottom-side line 15B and the rod-side line 15A communicate with each other via the port 23A, the axial bore 25B, the spring chamber 34, the oil channel 24B, the port 23B, etc. in the oscillation-preventing valve 21, whereby the rod-side hydraulic chamber 10A and the bottom-side hydraulic chamber 10B abruptly reach the same pressure.

Consequently, as shown by a dotted characteristic line 37 in FIG. 21A, the pressure in the bottom-side hydraulic chamber 10B rapidly falls between points B and C. When the bottom-side pressure and rod-side pressure become equal at the position of point C, the valve member 25 in the oscillation-preventing valve 21 is caused to slide, by the weak spring 32, up to the illustrated position at which the plunger 28 is seated on the valve seat 28A. At this position, the valve member 25 again shuts off communication between the lines 22 and 36, that is, the communication between the bottom-side line 15B and the rod-side line 15A. In this manner, the bottom-side pressure is held at the pressure level indicated by point C, and the boom cylinder 10 is rapidly halted or stopped.

As is apparent from the foregoing, the first embodiment makes it possible to halt the boom 7 at a stable position as shown by a dotted characteristic line 38 in FIG. 21B even when an operator abruptly stop the boom 7 during a rapid downward movement. In other words, it is possible to prevent the room 7 from vibrating up and down and repeating oscillations as shown by the characteristic line 20 in FIG. 21B. Accordingly, the bucket 9 can be rapidly positioned, whereby it is possible to enjoy various benefits, for example, an improvement in working efficiency.

In the explanation of the first embodiment, it has been stated that the port 23B of the oscillation-preventing valve 21 is connected to the rod-side line 15A via the line 36. Alternatively, however, the port 23B may be connected to the tank line 17 via the line 39 as shown by the two-dot chain line in FIG. 1. This arrangement also makes it possible to achieve advantages and effects similar to those of the above embodiment.

Figure 3:
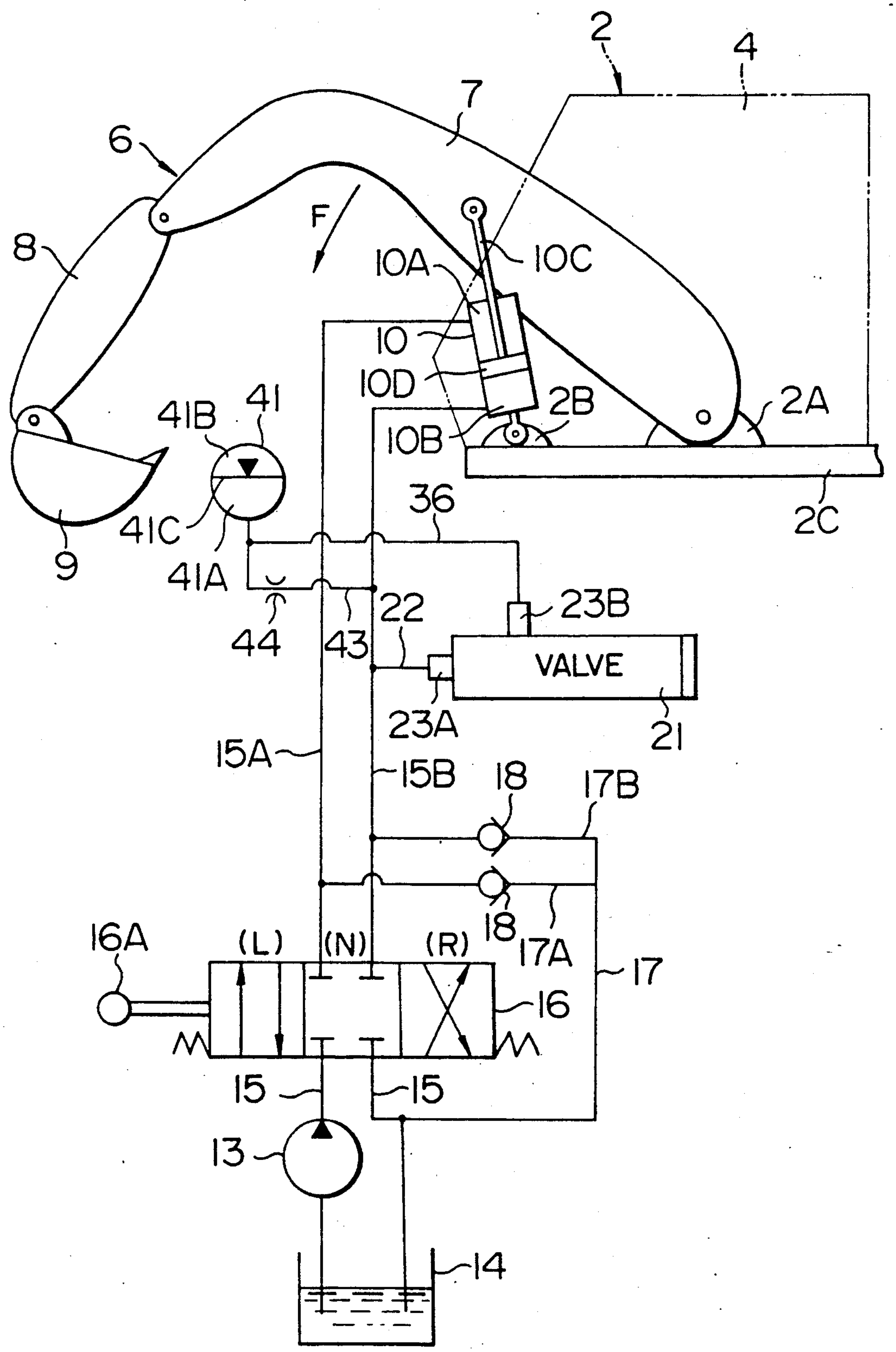
FIG. 3 is a schematic diagram showing a second embodiment of the present invention.

Next, FIG. 3 shows a second embodiment of the present invention.

The feature of the second embodiment is that the port 23B of the oscillation-preventing valve 21 is connected to an accumulator 41 via a line 42 so that the bottom-side pressure is released into an oil reservoir 41A in the accumulator 41. In the accumulator 41, the oil reservoir 41A and a gas chamber 41B are defined by a flexible partition 41C such as a diaphragm, and the gas chamber 41B is charged with a pressurized gas. The oil reservoir 41A is connected to an intermediate point of the bottom-side line 15B via a line 43, and the line 43 has a restriction 44 at an intermediate location between connections with the lines 15B and 42.

The second embodiment having the above-described arrangement and construction also makes it possible to achieve advantages and effects similar to those of the first embodiment. In addition, since the oil reservoir 41A of the accumulator 41 is connected to the bottom-side line 15B via the line 43 having the restriction 44, it is possible to maintain the interior of the oil reservoir 41A at a pressure lower than the bottom-side pressure, that is, at a pressure close to the holding pressure required to stably stop the boom 7. In consequence, when the bottom-side pressure is released into the oil reservoir 41A via the line 42 by the operation of the oscillation-preventing valve 21, the bottom-side line 15B, the bottom-side hydraulic chamber 10B and so on can be maintained at a pressure close to the aforesaid holding pressure. Accordingly, it is possible to reliably stop the boom 7 at a more stable position.

Figure 4:
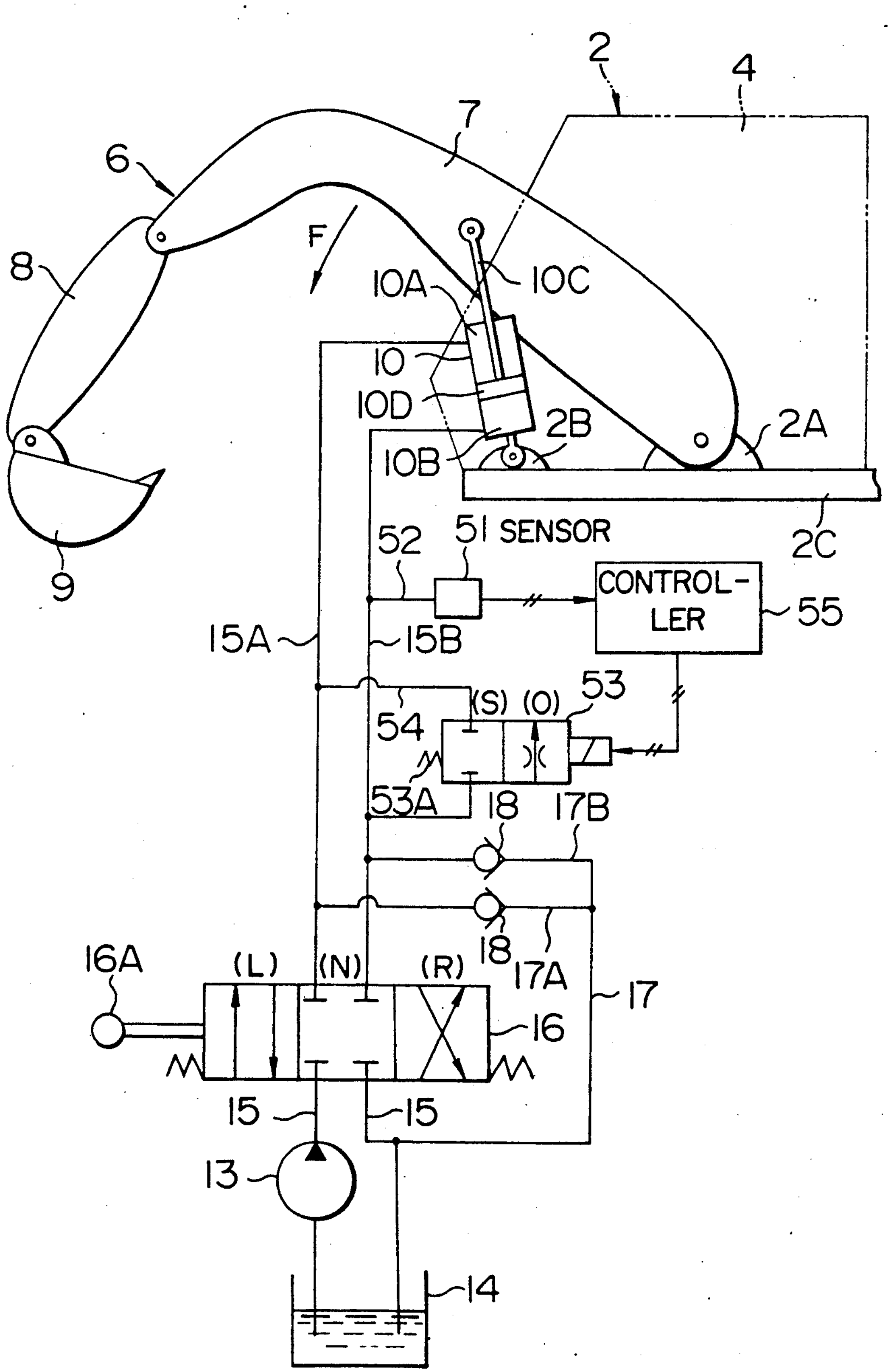
FIG. 4 is a schematic diagram showing a third embodiment of the present invention.
Figure 5:
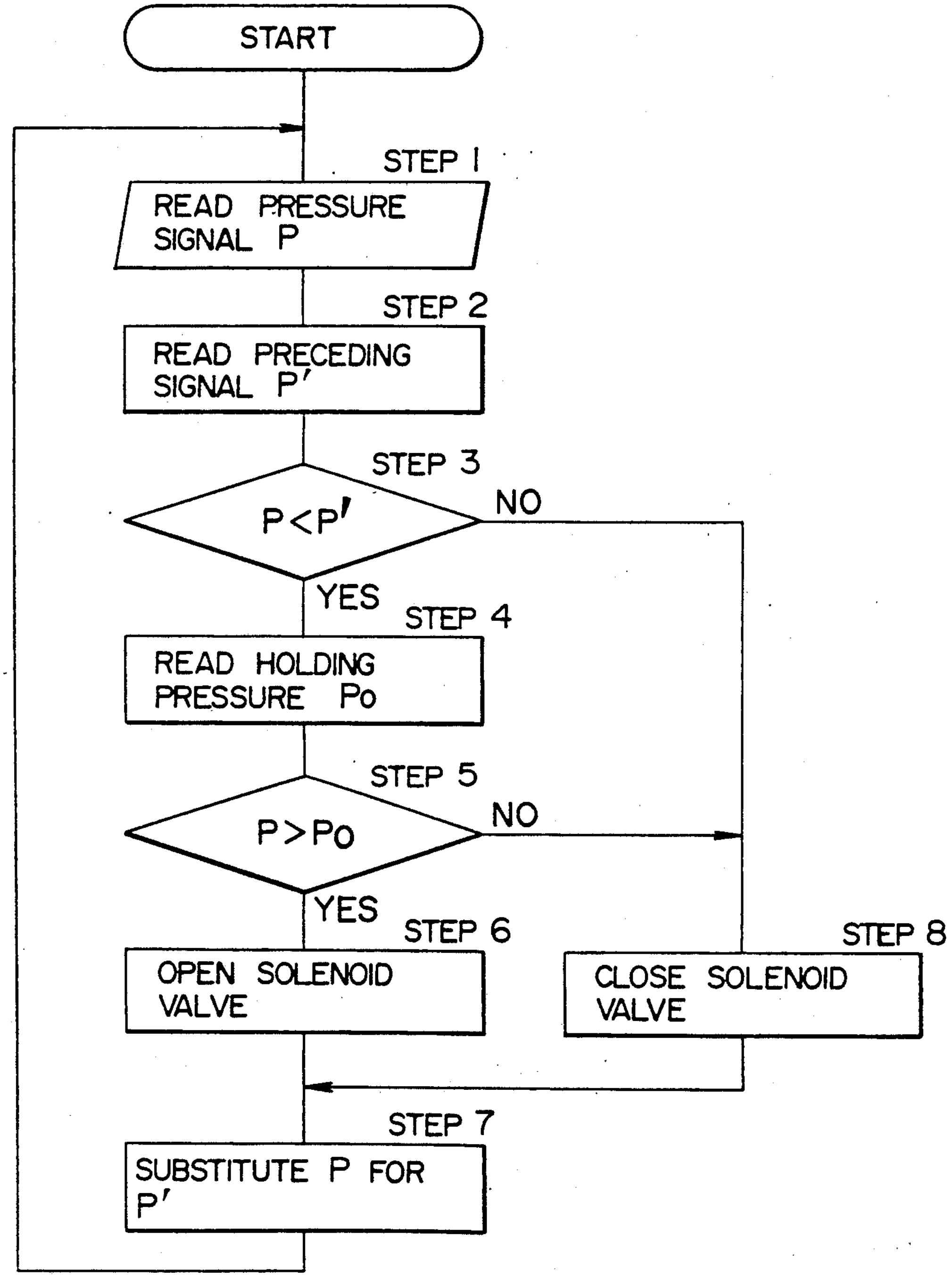
FIG. 5 is a flow chart showing the valve control process executed by a controller in the system of FIG. 4.

FIGS. 4 and 5 show a third embodiment of the present invention. The feature of the third embodiment is that the bottom-side pressure is detected by using a pressure sensor and that when the pressure detected by the pressure sensor changes from rise to fall, a solenoid valve is opened.

As shown in FIG. 4, a pressure sensor 51 is connected via a line 52 to an intermediate portion of the bottom-side line 15B. The pressure sensor 51 detects the bottom-side pressure of the boom cylinder 10 and outputs a pressure signal P to a controller 55 which will be described later. Reference numeral 53 denotes a solenoid valve disposed midway along a line 54 which connects the rod-side line 15A and the bottomside line 15B. The solenoid valve 53 is switched from its closed position S to its open position O in response to an operating signal from the controller 55. When the outputting of the operating signal is ceased, the solenoid valve 53 is returned to the closed position S by the urging force of a spring 53A.

The controller 55 consists of a microcomputer and elements associated therewith, and its input side is connected to the pressure sensor 51 with the output side connected to the solenoid valve 53.

The controller 55 is arranged to store the program shown in FIG. 5 in its memory circuit and to execute the process of controlling the operation of the solenoid valve 53. Also, the preceding pressure signal P' as well as the pressure signal P output from the pressure sensor 51 is stored in a memory area in the memory circuit of the controller 55, and the other memory area stores therein a predetermined holding pressure Po which corresponds to the holding pressure required to stably halt the boom 7.

The process of the controller 55 to control the solenoid valve 53 is explained below with reference to FIG. 5.

When the process is started, the controller 55 reads the pressure signal P output from the pressure sensor 51 at Step 1 and, at Step 2, reads out the preceding pressure signal P'. At Step 3, the controller 55 determines whether or not the pressure signal P is lower than the pressure signal P'. If the answer is "NO" at Step 3, this means that the boom 7 is abruptly halted during rapid downward movement and the bottomside hydraulic chamber 10B is exposed to a compression action due to the inertial force F. In such case, the bottom-side pressure rises. Accordingly, if the answer is "NO" at Step 3, the process proceeds to Step 8, where the controller 55 continues halting outputting of the operating signal to the solenoid valve 53 and holds the solenoid valve 53 at the closed position S as illustrated. At Step 7, the controller 55 substitutes the current pressure signal P for the preceding pressure signal P' stored in the memory area and repeats the sequence of steps starting with Step 1.

If the answer is "YES" at Step 3, this means that, as shown by the characteristics line 19 of FIG. 21A, the pressure in the bottom-side hydraulic chamber 10B rises from point A to point B. At point B, the bottom-side pressure changes from rise to fall, in which case the process proceeds to Step 4. At Step 4, the controller 55 reads out the holding pressure Po from the memory area and, at Step 5, determines whether or not the pressure P is larger than the holding pressure Po. If the answer is "YES" at Step 5, the process proceeds to Step 6, where the controller 55 outputs an operating signal to the solenoid valve 53 to switch the solenoid valve 53 to the open position O. In this manner, at the instant when the bottom-side pressure changes from rise to fall, that is, at point B shown in FIG. 21A, the solenoid valve 53 causes the bottom-side line 15B to communicate with the rod-side line 15A via the line 54, whereby the bottom-side pressure is abruptly decreased.

The process then proceeds to Step 7, where the controller 55 substitutes the current pressure signal P for the preceding pressure signal P' stored in the memory area and repeats the sequence of steps starting with Step 1.

If the answer is "NO" at Step 5, this indicates that the solenoid valve 53 is open and the pressure signal P from the pressure sensor 51 is lower than the holding pressure Po. In this case, the process proceeds to Step 8, where the controller 55 halts outputting of the operating signal to the solenoid valve 53 and closes the solenoid valve 53 as shown in FIG. 4. In this manner, the pressure in the bottom-side hydraulic chamber 10B of the boom cylinder 10 is controlled as shown by the characteristic line 37 in FIG. 24. Accordingly, the pressure in the bottom-side hydraulic chamber 10B can be held at a pressure level corresponding to the holding pressure indicated by, for example, point C, and the boom 7 can be stably halted as shown by the characteristic line 38 in FIG. 21B.

The third embodiment having the abovedescribed arrangement and construction makes it possible to achieve advantages and effects similar to those of the first embodiment.

In the explanation of the third embodiment, it has been stated that the solenoid valve 53 is opened to release the bottom-side pressure into the rod-side line 15A. However, alternatively, the bottom-side pressure may be released into the tank line 17 or, as explained in connection with the second embodiment, it may be released into the accumulator 41.

Figure 6:
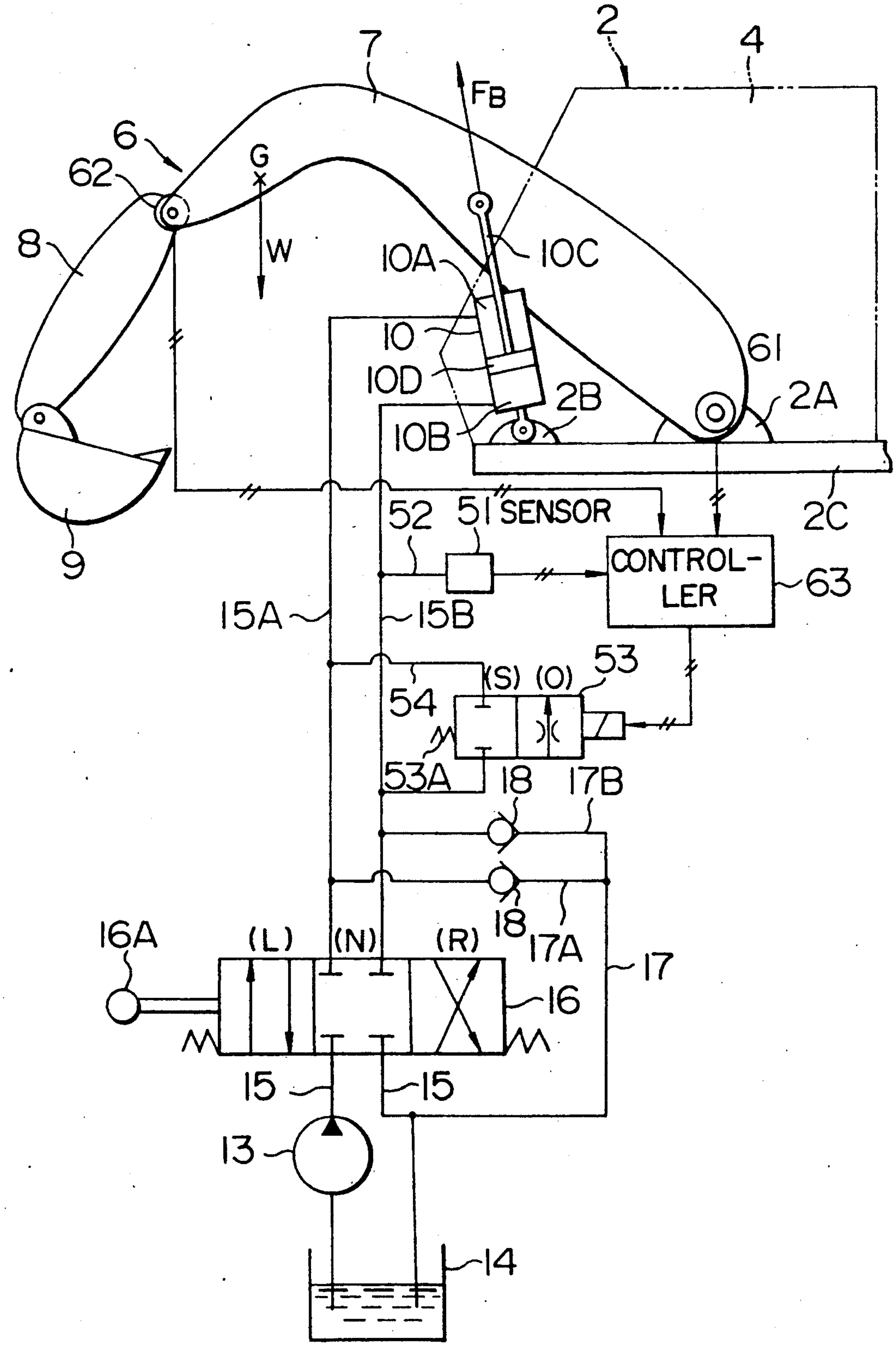
FIG. 6 is a schematic diagram showing a fourth embodiment of the present invention.

FIG. 6 shows a fourth embodiment of the present invention.

The feature of the fourth embodiment is that angle sensors 61 and 62 are provided at the pin-connection of the boom 7 and the bracket 2A and the pin-connection of the boom 7 and the arm 8, respectively, and also that a controller 63 is connected to the angle sensors 61 and 62. In this arrangement, the angle sensors 61 and 62 output rotational-angle signals indicating the angles of rotation of the boom 7 and the arm 8, respectively. The controller 63 computes the holding pressure required to halt the boom 7 on the basis of the respective rotational-angle signals of the boom 7 and the arm 8. The controller 63 keeps the solenoid valve 53 open until the pressure signal P from the pressure sensor 51 reaches the holding pressure Po corresponding to the above holding pressure.

The controller 63 consists of a computer and elements associated therewith as in the case of the controller 55 explained in connection with the third embodiment. In addition, the controller 63 computes the position of the center of gravity G of the entire working apparatus 6 shown illustratively in FIG. 6 as well as the holding force $F_B$ required for the boom cylinder 10 to support the total weight W of the working apparatus 6 which acts at the center of gravity G. The controller 63 further computes the holding pressure (holding pressure Po) in the bottom-side hydraulic chamber 1B of the boom cylinder 10 which is required to generate the above holding force $F_B$. Since the center of gravity G changes in position in accordance with variations in the respective angles of rotation of the boom 7 and the arm 8, the holding force $F_B$ changes in accordance with variation in the center of gravity G.

The controller 63 sequentially computes the position of the center of gravity G, the holding force $F_B$, the holding pressure Po and so on from the rotational angle signals from the respective angle sensors 61 and 62. The controller 63 thus sequentially updates the holding pressure Po, used in the steps 4 and 5 in FIG. 5 explained in connection with the third embodiment, on the basis of the rotational-angle signals from the respective angle sensors 61 and 62.

The fourth embodiment having the abovedescribed arrangement and construction also makes it possible to achieve advantages and effect similar to those of the third embodiment. In addition, in the fourth embodiment, the holding pressure Po is sequentially updated on the basis of the signals output from the respective angle sensors 61 and 62. Accordingly, even if the operator is to abruptly halt the boom 7 at an arbitrary position during rotation thereof, it is possible to assure an optimum holding pressure in the bottom-side hydraulic chamber 10B of the boom cylinder 10. Accordingly, the boom 7 can be rapidly halted more stably and smoothly during a rapid downward movement.

Figure 7:
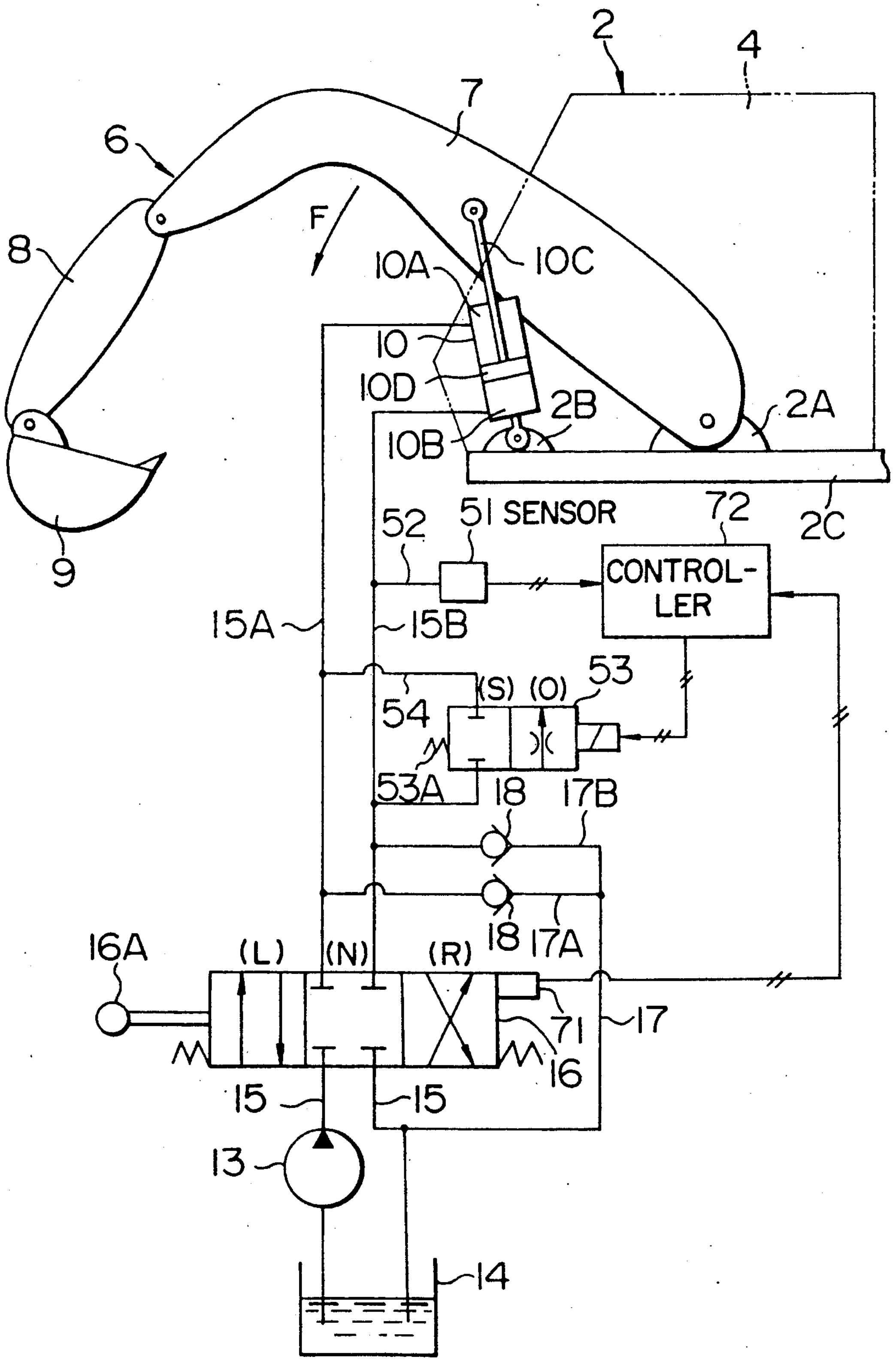
FIG. 7 is a schematic diagram showing a fifth embodiment of the present invention.
Figure 8:
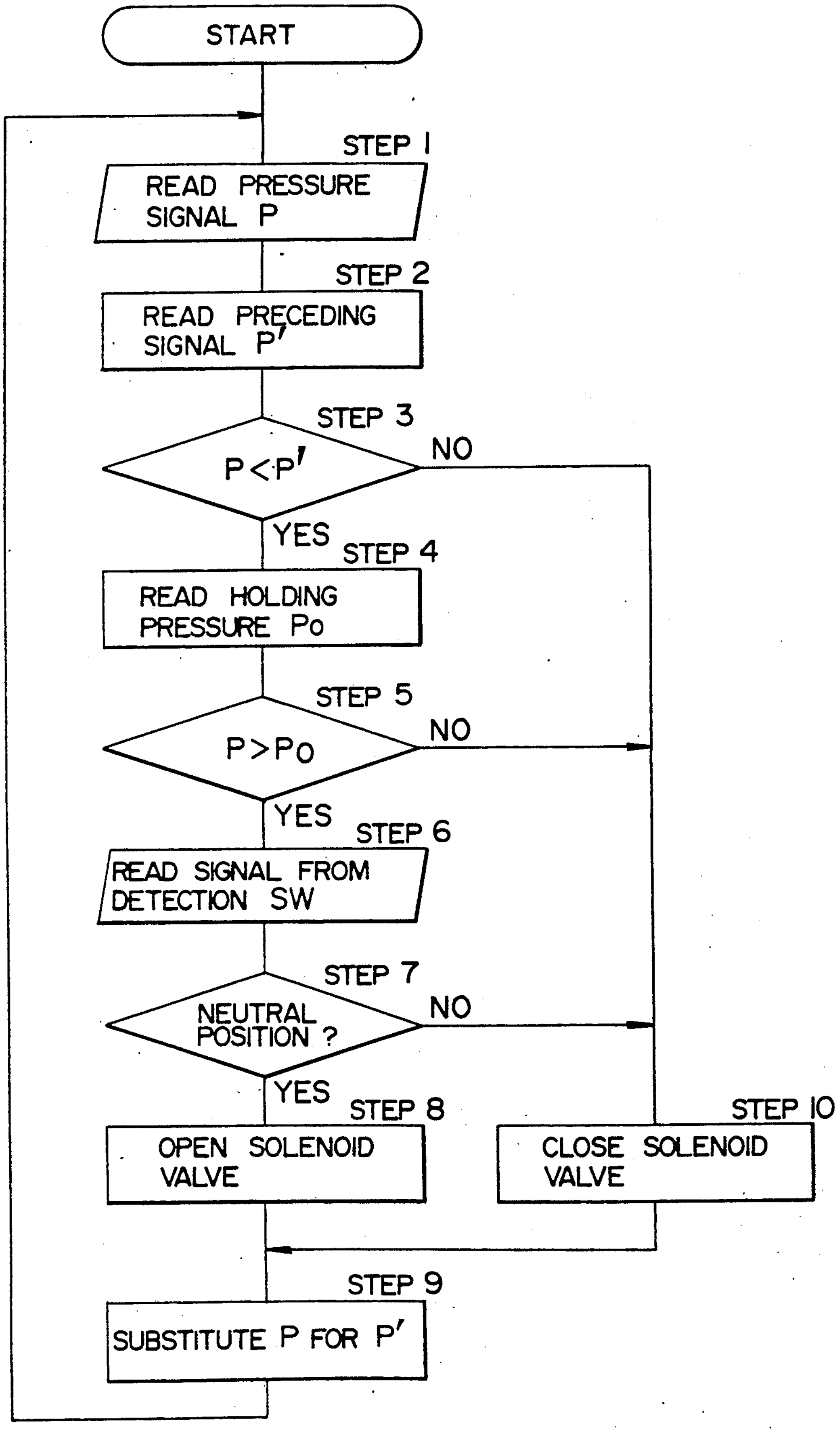
FIG. 8 is a flow chart showing the valve control process executed by a controller in the system of FIG. 7.

FIGS. 7 and 8 shows a fifth embodiment of the present invention. The feature of the fifth embodiment is that the directional selecting valve 16 is provided with a detection switch 71 which serves as a neutral position detecting means. When the directional selecting valve 16 is returned to its neutral position N, the detection switch 71 outputs an ON signal to a controller 72.

The controller 72 has a construction similar to that of the controller 55 which has been explained in connection with the third embodiment. In addition, the memory circuit of the controller 7 stores the program shown in FIG. 8 in order to execute the process of controlling the solenoid valve 53.

As shown in FIG. 8, the controller 72 executes a program similar to the program explained with reference to Steps 1 to 5 in FIG. 5. In addition, at Step 6, the controller 72 reads a signal output from the detection switch 71 and, at Step 7, determines whether or not this signal is an ON signal, that is, whether or not the directional selecting valve 16 is returned to the neutral position N. If the answer is "YES", the process proceeds to Step 8, where the solenoid valve 53 is opened. If the answer is "NO", the process proceeds to Step 10, where the solenoid valve 53 is closed and the sequence of steps subsequent to step 10 is repeated.

The fifth embodiment having the above-described arrangement and construction also makes it possible to achieve advantages and effects similar to those of the third embodiment. In addition, the fifth embodiment is arranged to determine whether or not the directional selecting valve 16 has been returned to the neutral position N. Accordingly, the fifth embodiment makes it possible to achieve various advantages: for example, if the directional selecting valve 16 is not returned to the neutral position N, that is, if the boom 7 is not to be halted, it is possible to prevent the solenoid valve 53 from being erroneously opened.

In each of the third, fourth and fifth embodiments, the pressure sensor 51 is connected via the line 52 to the pressure sensor 51 at an intermediate portion thereof. Alternatively, the pressure sensor 51 may be disposed in, for example, the bottom-side hydraulic chamber 10B of the boom cylinder 10.

Figure 9:
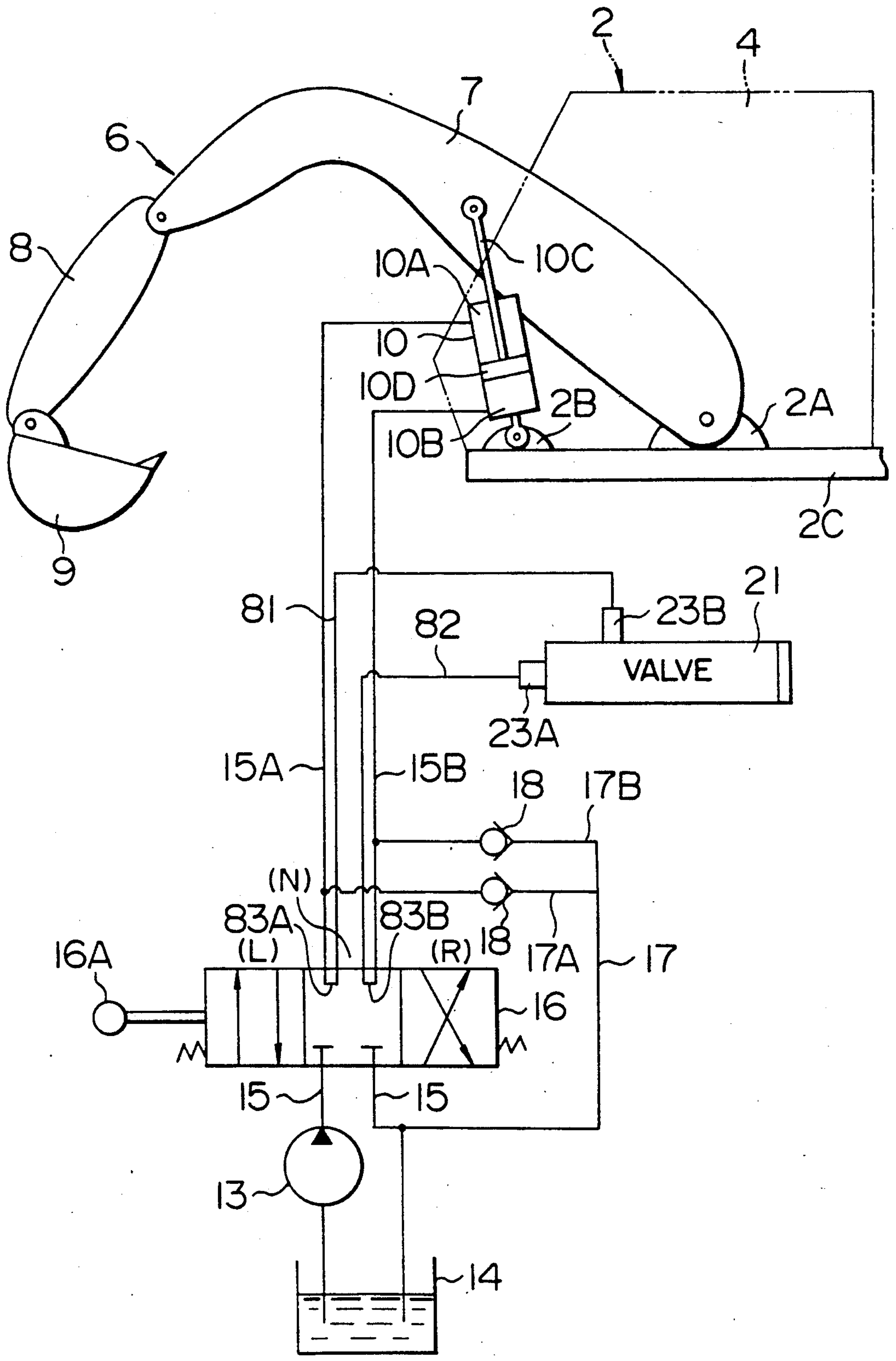
FIG. 9 is a schematic diagram showing a sixth embodiment of the present invention.

FIG. 9 shows a sixth embodiment of the present invention. The feature of the sixth embodiment is that the oscillation-preventing valve 21 and the directional selecting valve 16 are connected by lines 81 and 82, and that lines 83A and 83B are formed as neutral position detecting means at the spool or the like of the directional selecting valve 16. When the directional selecting valve 16 is switched to its neutral position N, the lines 83A and 83B cause the rod-side line 15A and the bottom-side line 15B to communicate with lines 81 and 82, respectively, so that the rod-side and bottomside lines 15A and 15B are connected to the outlet ports 23B and 23A of the oscillation-preventing valve 21 via the lines 81 and 82, respectively.

The sixth embodiment having the above-described arrangement and construction also makes it possible to achieve advantages and effects similar to those of the first embodiment. In addition, the hydraulic lines 83A and 83B are formed at the spool or the like of the directional-selecting valve 16. Only when the directional selecting valve 16 is returned to the neutral position N, the lines 81 and 82 are made to communicate with the rod-side line 15A and the bottomside line 15B, respectively. Accordingly, only when the boom 7 is halted, the bottom-side pressure from the bottom-side line 15B can be introduced into the oscillation-preventing valve 21 through the hydraulic line 83B and the line 82. It is therefore possible to reliably prevent the bottom-side pressure from being released into the line 81 when the bottom is not halted.

Figure 10:
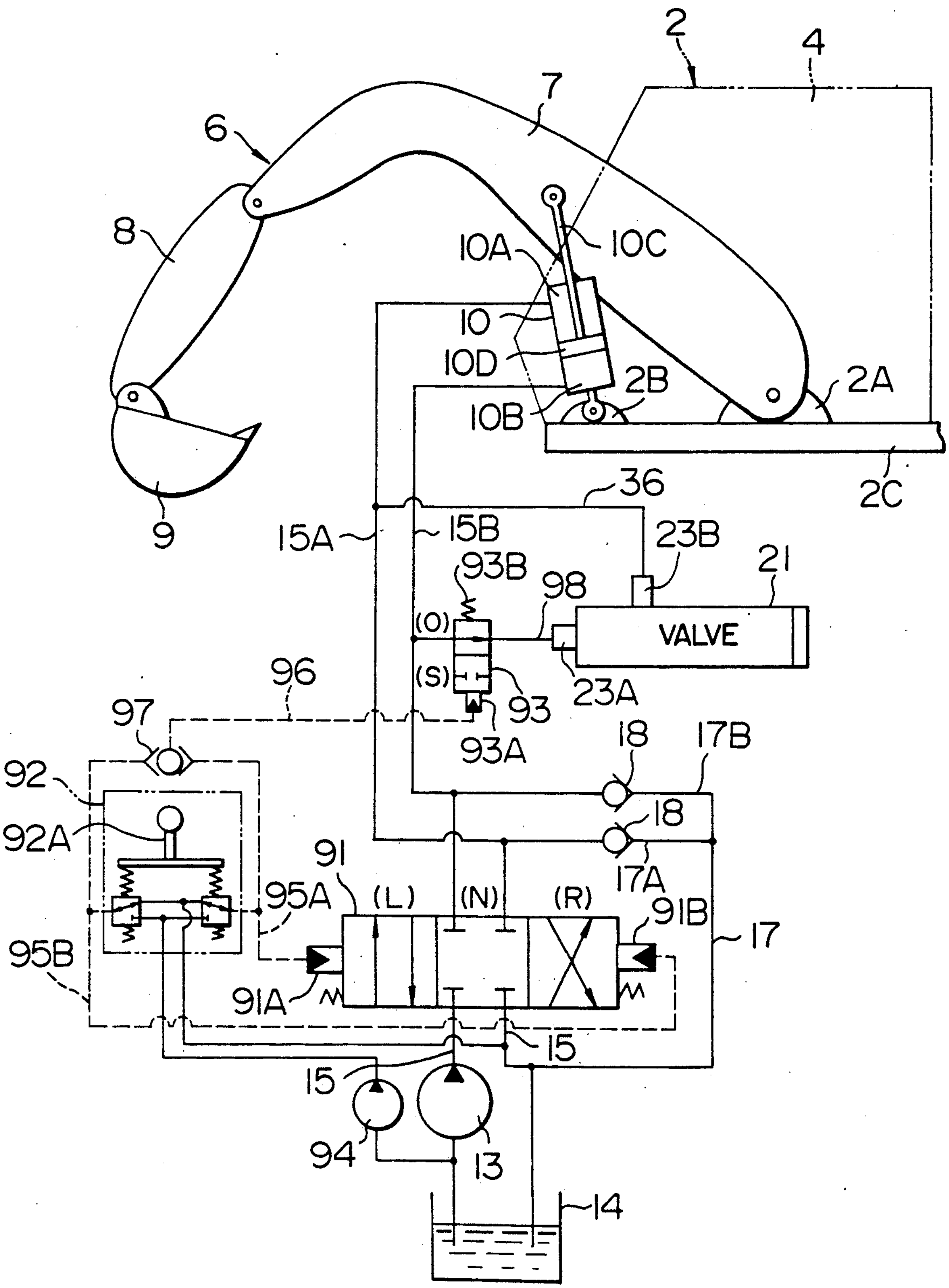
FIG. 10 is a schematic diagram showing a seventh embodiment of the present invention.

FIG. 10 shows a seventh embodiment of the present invention. The feature of the seventh embodiment is that a directional selecting valve 91 is disposed midway along each of the main lines 15, and that a pressure-reducing type pilot valve 92 and a change-over valve 93 are provided. The pressure-reducing type pilot valve 92 serves to switch the operation of the directional-selecting valve 91 and a change-over valve 93 serves to connect the oscillation-preventing valve 21 with the bottom-side line 15B in accordance with the operational position of the pilot valve 92. The change-over valve 91 is switched from its neutral position N to its switched position L or R by the pilot pressure applied by the pilot valve 92. Only when the operating lever 92A of the pilot valve 92 is returned to the neutral position N, the change-over valve 93 is switched from the closed position S to the open position 0.

The pilot valve 92 is arranged to provide pressure-reducing control over the pressure oil supplied from an auxiliary pump 94 in accordance with the angle through which the operating lever 92A is operated. The reduced pressure oil is supplied as pilot pressure to hydraulic-pressure pilot portions through pilot lines 95A and 95B, respectively. Disposed between the pilot lines 95A and 95B, is a shuttle valve 97 which serves as a high-pressure selecting valve for selecting a higher pressure and supplying it to a control line 96. The hydraulic fluid from the shuttle valve 97 is supplied through a control line 96 to a hydraulic-pressure pilot section 93A of the change-over valve 93. The change-over valve 93 is disposed midway along a line 98 which connects the bottom-side line 15B and the port 23A of the oscillation-preventing valve 21. If the operating lever 92A is operated to produce a pilot pressure higher than the tank pressure in the pilot line 95A or 95B, the change-over valve 93 is switched to the closed position S by this pilot pressure.

If the operating lever 92A is returned to its neutral position N, the pilot lines 95A and 95B are connected to the tank 14 and the pressure in each of the pilot lines 95A and 95B is set to tank pressure. Accordingly, the directional selecting valve 91 is returned to its neutral position N and the control line 96 which connects the shuttle valve 97 and the pressure in the hydraulic-pressure pilot section 93A of the change-over valve 93 is set to the tank pressure. Thus the change-over valve 93 is automatically switched to its open position 0 by a spring 93B. In the above arrangement, the change-over valve 93, the shuttle valve 97 and the control line 96 constitute detecting means for detecting whether or not the directional selecting valve 91 is set to the neutral position N.

The seventh embodiment having the abovedescribed arrangement and construction also makes it possible to achieve effects and advantages similar to those of the sixth embodiment.

Figure 11:
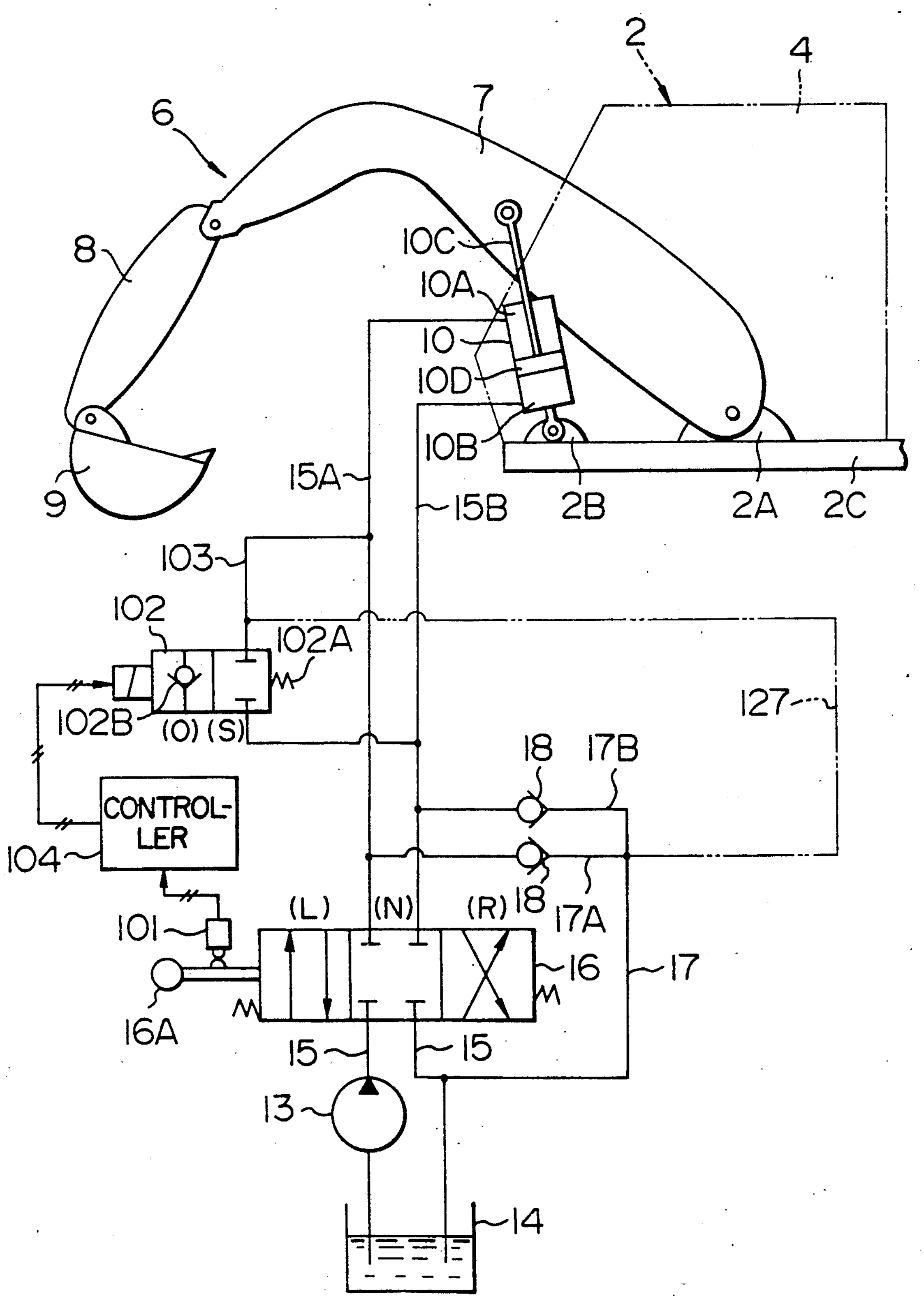
FIG. 11 is a schematic diagram showing an eighth embodiment of the present invention.

Subsequently, an eighth embodiment is explained below with reference to FIG. 11.

As illustrated, reference numeral 101 denotes a neutral-position detecting switch which is disposed at, for example, the proximal position of the operating lever 16A. When the directional selecting valve 16 is set to the neutral position N as shown, the detecting switch 101 outputs an ON signal. Also, when the operating lever 16A is manually operated to switch the directional selecting valve 16 from the neutral position N to the swtiched position L or R, the neutral-position detecting switch 101 outputs an OFF signal as a detection signal.

A solenoid valve 102 is disposed midway along a line 103 which connects the rod-side line 15A and the bottom-side line 15B. The solenoid valve 103 is switched from the closed position S to the open position 0 in response to the operating signal output from a controller 104 which will be described later. While the controller 104 is outputting no operating signal, the solenoid valve 102 is automatically returned to the closed position S as illustrated.

The controller 104 consists of a microcomputer and elements associated therewith, and the input side of the controller 104 is connected to the neutral-position detecting switch 101 with the output side connected to the solenoid valve 102. The controller 104 stores in its memory circuit, for example, a timer and the program shown in FIG. 12 so as to execute the process of controlling the solenoid valve 102. The controller 104 also stores in the memory circuit a measurement time interval corresponding to a predetermined time period ($t_1$ seconds) which determines the time during which the solenoid valve 102 is closed and a measurement time interval corresponding to a predetermined time period ($t_2$ seconds) which determines the timing during which the solenoid valve 102 is opened (refer to FIG. 13).

Figure 14:
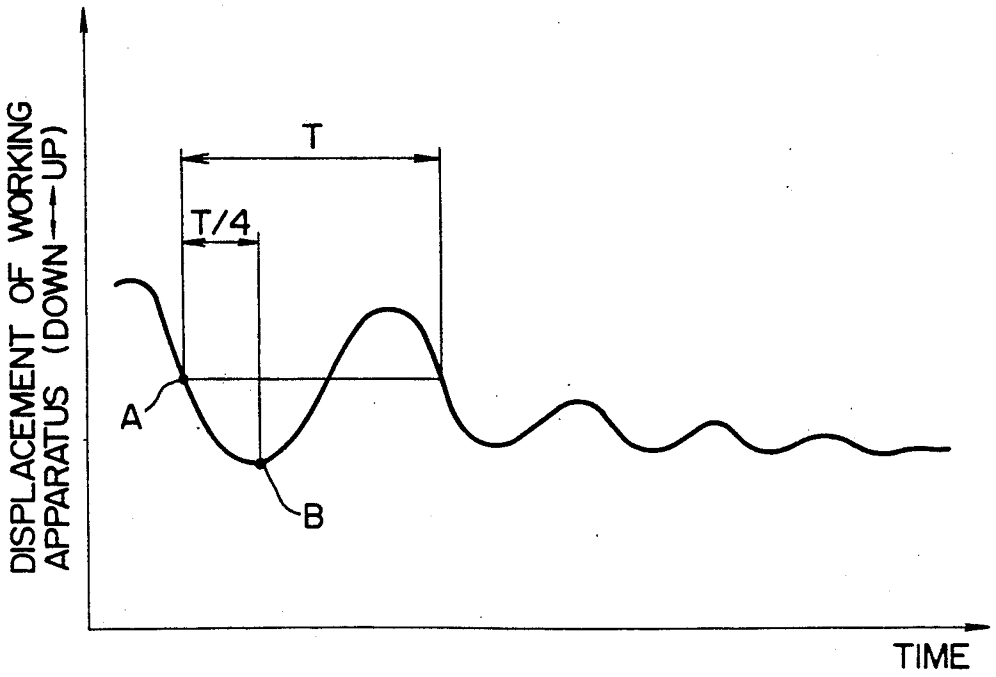
FIG. 14 is a chart showing the natural oscillation characteristic of a working apparatus.

The actuating time period and the open time period of the solenoid valve 102 are based on the period T of the specific frequency of the working apparatus shown in FIG. 14. This period T is set to a quarter period T/4 or thereabouts. The actuating time period of $t_1$ seconds is set to a time period which approximately corresponds to the quarter period T/4, while the open time period of $t_2$ seconds is set to a time period which is slightly shorter than the quarter time period T/4. Incidentally, FIG. 14 substantially corresponds to the characteristic line 20 which represents the frequency of the boom 7 when the boom 7 is to be halted at point A of FIG. 21B. This specific frequency characteristic does not depend on factors such as the speed at which the working apparatus 6 is being operated, and represents the specific frequency characteristic at which the working apparatus 6 is halted. Accordingly, the actuating time period of $t_1$ seconds and the open time period of $t_2$ seconds can be set to predetermined time periods on the basis of the quarter period T/4 of the period T of the specific frequency, respectively. It is, therefore, possible to provide an oscillation-preventing effect which will be described later.

Figure 19:
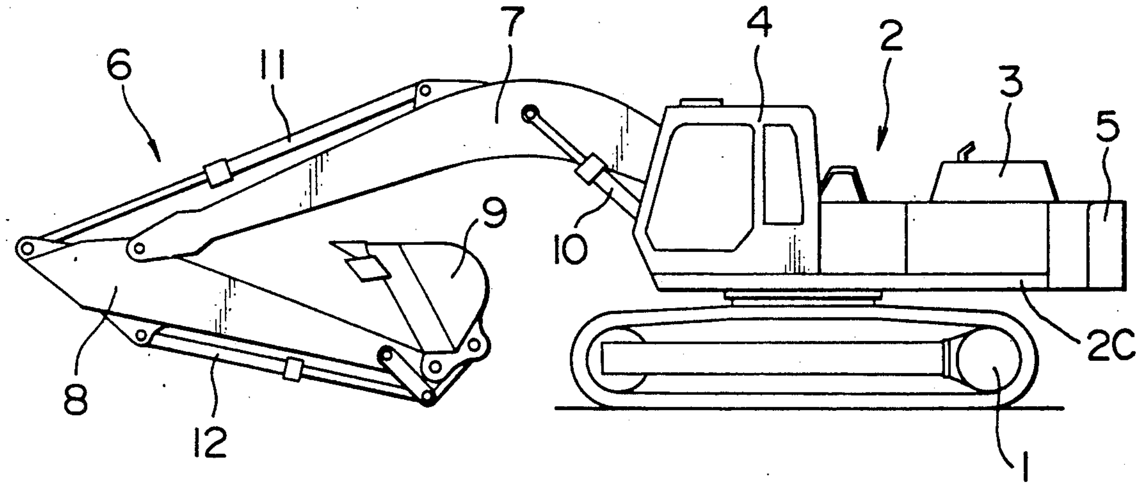
FIG. 19 is a schematic view showing the entire construction of a hydraulic excavator to which the present invention is applicable.

The hydraulic system for a boom cylinder according to the eighth embodiment has the above-described construction and arrangement, and its basic operation does not specifically differ from that of the arrangement shown in FIGS. 19 and 20.

Figure 12:
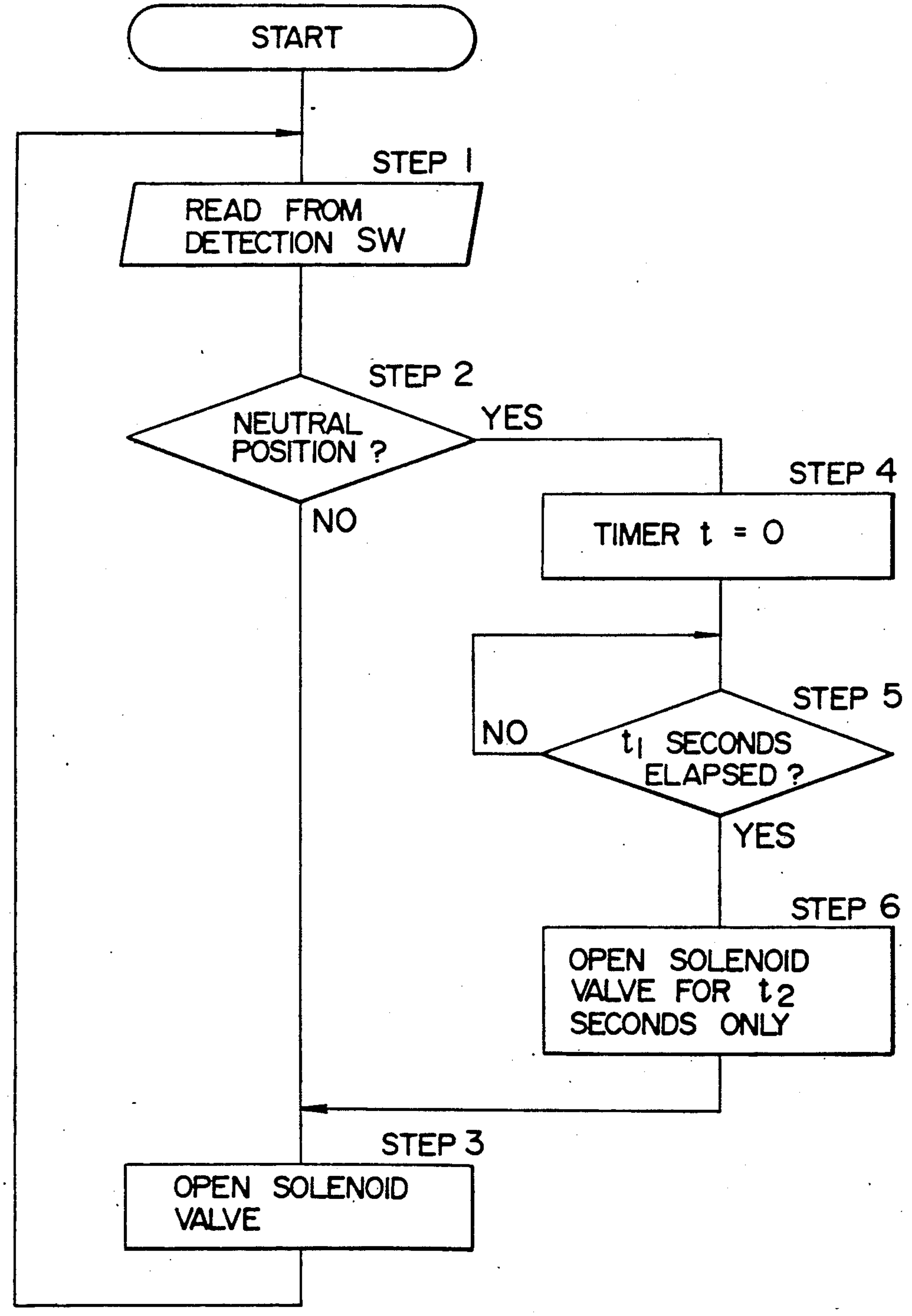
FIG. 12 is a flow chart showing the valve control process executed by a controller in the system of FIG. 11.

Accordingly, the process of the controller 104 to control the solenoid valve 102 will be explained below with reference to FIG. 12.

When the process is started, the controller 104 reads the signal output from the neutral-position detecting switch 101 at Step 1. At Step 2, the controller 104 determines whether or not the directional selecting valve 16 has been returned to its neutral position N. If the answer is "NO" at Step 2, this indicates that the detection signal output from the neutral-position detecting switch 101 is off (refer to FIG. 13) and that the directional selecting valve 16 has been switched from the neutral position N to the switched position L or R. Accordingly, the process proceeds to Step 3, where the controller 104 continues to halt outputting of an operating signal to the solenoid valve 102, and repeats the sequence of steps which starts with Step 1.

Figure 13:
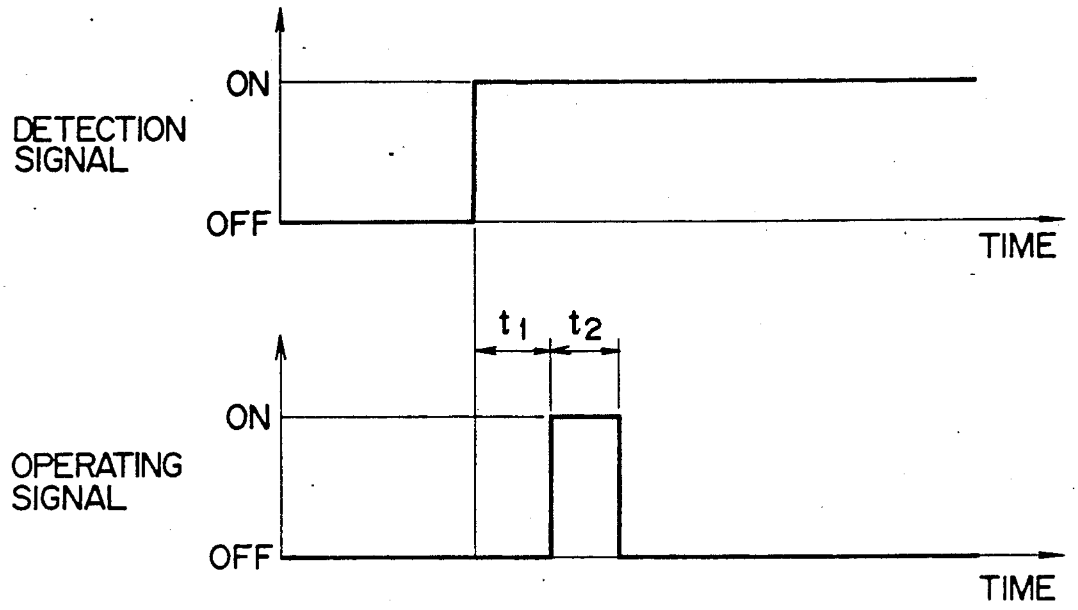
FIG. 13 is a chart showing the relationship between a neutral-position detection signal for a directional selecting valve and an operating signal generated by the controller in the system of FIG. 11.

If the answer is "YES" at Step 2, this indicates that the directional selecting valve 16 has been returned to its neutral position N and that the detection signal output from the detecting switch 101 is on. Accordingly, the process proceeds to step 4, where a timer t is reset to 0. Then, at Step 5, the controller 104 determines whether or not the predetermined actuating time period of $t_1$ seconds has elapsed from the time when the detection signal from the detecting switch 101 was switched on. If it is determined that $t_1$ seconds have elapsed, the process proceeds to Step 6. In this case, the controller 104 outputs operating signals to the solenoid valve 102 for only the predetermined time period $t_2$ as shown in FIG. 13, and switches the solenoid valve 102 from the closed position S to the open position 0 to keep the solenoid valve 102 open for $t_2$ seconds only.

In this manner, for example, when an operator is to abruptly halt the boom 7 during a rapid downward movement by abruptly returning the directional selecting valve 16 from its switched position L to the neutral position N, the solenoid valve 102 is kept open for only the predetermined time period of $t_2$ seconds after $t_1$ seconds have elapsed. Consequently, at the instant when the bottom-side pressure in the bottom-side line 15B which communicates with the bottom-side hydraulic chamber 10B of the boom cylinder 10 changes from rise to fall as shown by the characteristic line 19 of FIG. 21A, for example, at point B, the bottom-side pressure can be released from the bottom-side line 15B to the rod-side line 15A via the line 103. Accordingly, the bottom-side pressure can be abruptly decreased as shown by the dotted characteristic line 37 in FIG. 21A.

More specifically, the $t_1$ seconds which is the actuating time period of the solenoid valve 102 is set as a time period which corresponds to the quarter period T/4 of the period T of the specific frequency of the working apparatus shown in FIG. 14. The $t_1$ seconds can therefore be made equal to the period which elapses from the time when the directional selecting valve 16 is returned to the neutral position N at point A shown in FIG. 21A until point B is reached. Accordingly, the solenoid valve 102 can release the bottom-side pressure to the low-pressure side, for example the rod-side line 15A, at point B, thereby causing the bottom-side pressure to decrease abruptly. Also, the open time period of the solenoid valve 102 is set to $t_2$ seconds. Accordingly, when the bottom-side pressure is decreased to the pressure level of point C, as shown by the dotted characteristic line 37 of FIG. 21A, and the bottom-side line 15B and rod-side line 15A reach approximately the same pressure, then the solenoid valve 102 can be closed again (refer to Step 3 of FIG. 21). It is therefore possible to prevent the boom 7 from oscillating up and down, as shown by the characteristic line 20 in FIG. 21B.

Incidentally, when the operator returns the directional selecting valve 16 from the switched position R to the neutral position N to halt the boom 7 during a rapid downward movement, the solenoid valve is opened at Step 6. In this case, however, since the solenoid valve 102 includes a check valve 102B, hydraulic fluid is prevented from flowing backward from the rod-side line 15A to the bottom-side line 15B.

As is apparent from the foregoing, in accordance with the eighth embodiment, if the operator is to halt the boom 7 during a rapid downward movement by returning the directional selecting valve 16 to the neutral position N, then the solenoid valve 102 is kept open for only $t_2$ seconds to release the bottom-side pressure to the rod-side line 15A, for example, at point B at which the predetermined time period of $t_1$ seconds elapses from the time when the directional selecting valve 16 is returned to the neutral position N. Accordingly, the bottom-side pressure can be abruptly decreased between points B and C as shown by the characteristic line 37 of FIG. 21A so that the bottom-side pressure can be maintained at the pressure level of point C. Accordingly, the boom 7 can be stably halted as shown by the dotted characteristic line 38 of FIG. 21B, and the bucket 9 can be rapidly positioned, whereby it is possible to enjoy various benefits, for example, an improvement in working efficiency.

Figure 15:
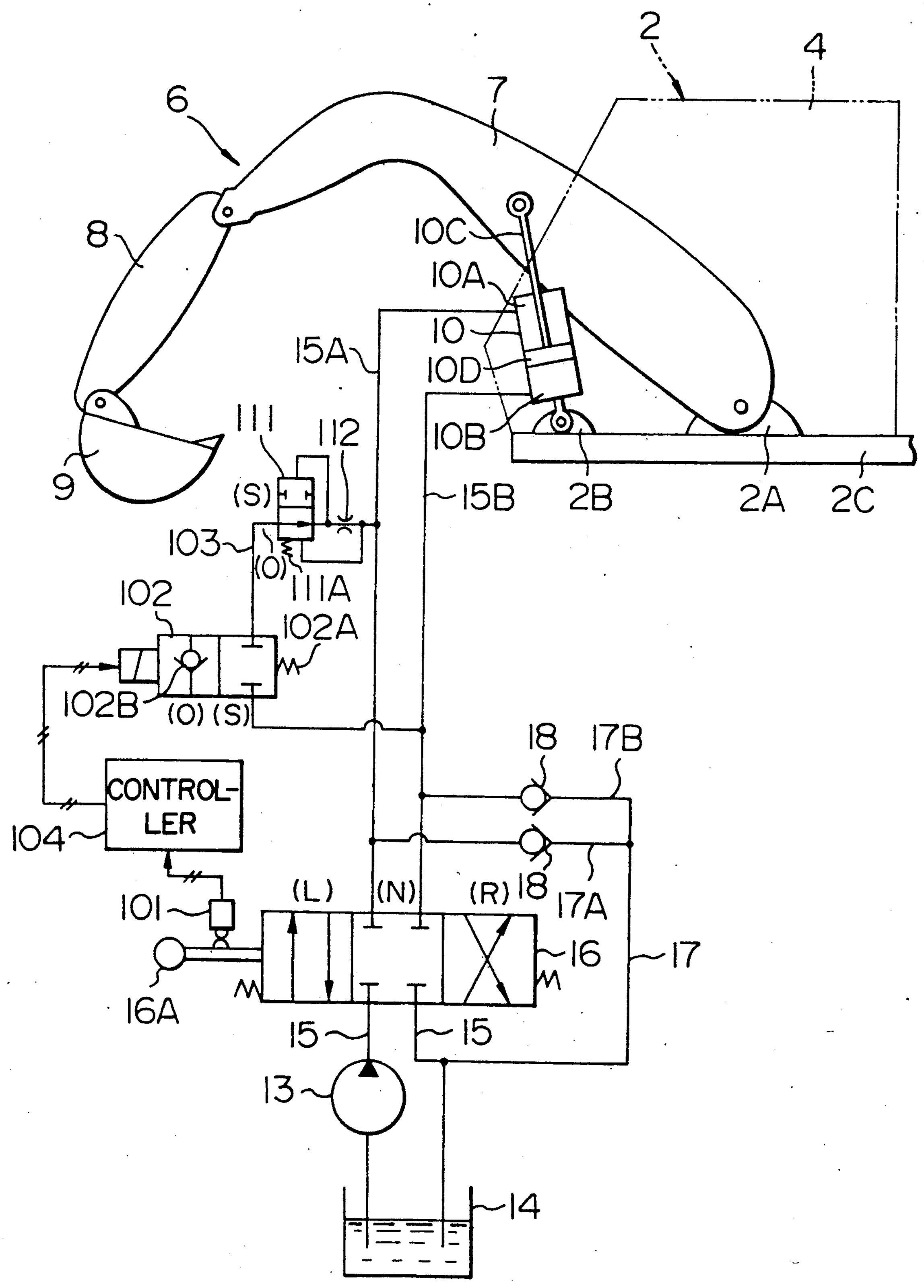
FIG. 15 is a schematic diagram showing a ninth embodiment of the present invention.

FIG. 15 shows a ninth embodiment of the present invention.

The feature of the ninth embodiment is that a flow control valve 111 is disposed midway along the line 103 in series with the solenoid valve 102. The flow control valve 111 is normally set to its open position 0 by the urging force of a spring 111A. When the solenoid valve 102 is switched to its open position 0 and a large amount of hydraulic fluid flows through the line 103 from the bottom-side line 15B to the rod-side line 15A, the flow control valve 111 is switched to its closed position S against the urging force of the spring 111A by the oil pressure which is raised by the action of a restriction 112, thereby controlling the flow rate of the pressure oil which flows through the restriction 112.

The ninth embodiment having the arrangement and construction described above makes it possible to achieve advantages and effects similar to those of the eighth embodiment. In addition, in the ninth embodiment, since the flow control valve 111 is disposed midway along the line 103, it is possible to prevent an excessive amount of hydraulic fluid from flowing from the bottom-side line 15B to the rod-side line 15A when the solenoid valve 103 is opened. Accordingly, since the boom 7 is prevented from moving down to an excessive extent, it is possible to enjoy various benefits, for example, improved safety in operation.

The eighth and ninth embodiments have been explained with reference to the arrangement in which the solenoid valve 102 is disposed midway along the line 103 which connects the rod-side line 15A and bottom-side line 15B. However, the solenoid valve 127 may also be disposed midway along a line 127 which connects the bottomside line 15B and the tank line 17 is shown by a two-dot chain line in FIG. 11.

The flow control valve 111 and the restriction 112 explained in connection with the ninth embodiment may also be disposed in series with the solenoid valve 102 midway along the line 127. Even if the solenoid valve 102 is disposed along the line 127, or even if the flow control valve 111 and so on are disposed together with the solenoid valve 102, the bottom-side pressure can be released to the low-pressure side such as the tank line 17 and the boom 7 can be stably halted.

The neutral-position detecting switch 101 may be disposed, for example, at one end of the direction-switching valve 16.

Figure 16:
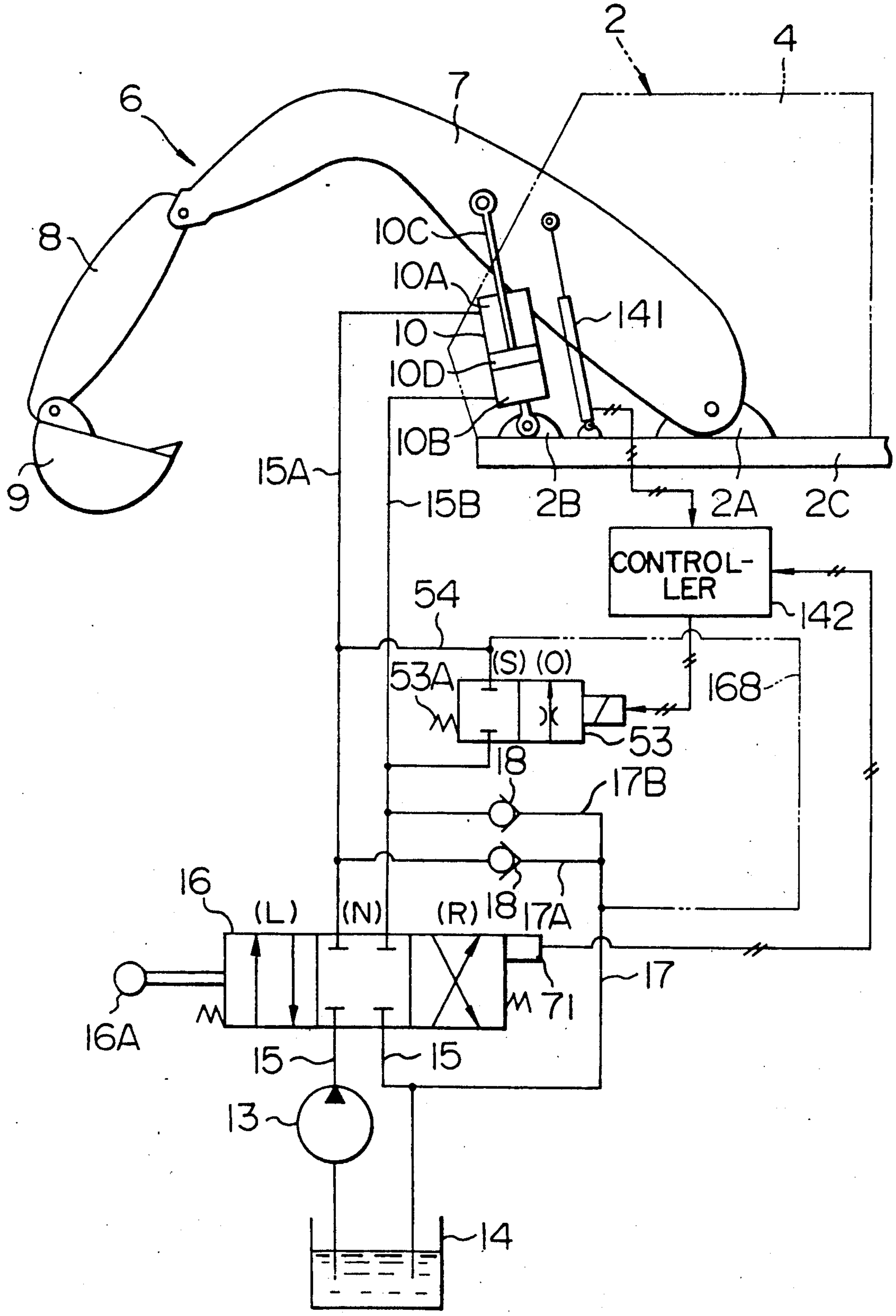
FIG. 16 is a schematic diagram showing a tenth embodiment of the present invention.

Subsequently, a tenth embodiment of the present invention is shown in FIG. 16.

As illustrated, a detecting cylinder 141, which serves as a displacement sensor, is rotatably pin-connected to the boom 7 and the swinging frame 2C. The detecting cylinder 141 detects the displacement of the boom 7 with respect to the swinging frame 2C when the boom 7 moves up and down, and outputs a displacement signal P to the controller 124 which will be described later. The solenoid valve 53, which is similar to that used in the embodiment of FIG. 4, is disposed midway along the line 54 which connects the rod-side line 15A and the bottom-side line 15B. This solenoid valve 53 is swtiched from the closed position S to the open position 0 in response to the operating signal output from the controller 141. When the controller 141 stops outputting the operating signal, the solenoid valve 53 is automatically returned to the closed position S.

The directional selecting valve 16 is provided with the neutral-position detecting switch 71, as in the embodiment shown in FIG. 7. When the directional selecting valve 16 is in its neutral position N, the detecting switch 71 outputs an ON signal to the controller 142. If the directional selecting valve 16 is slightly shifted from the neutral position N to the switched position L or R, the detecting switch 71 outputs an OFF signal.

The controller 142 consists of a microcomputer and elements associated therewith, and its input side is connected to the detecting cylinder 141 and the neutral-position detecting switch 71 with the output side connected to the solenoid valve 53.

Figure 17:
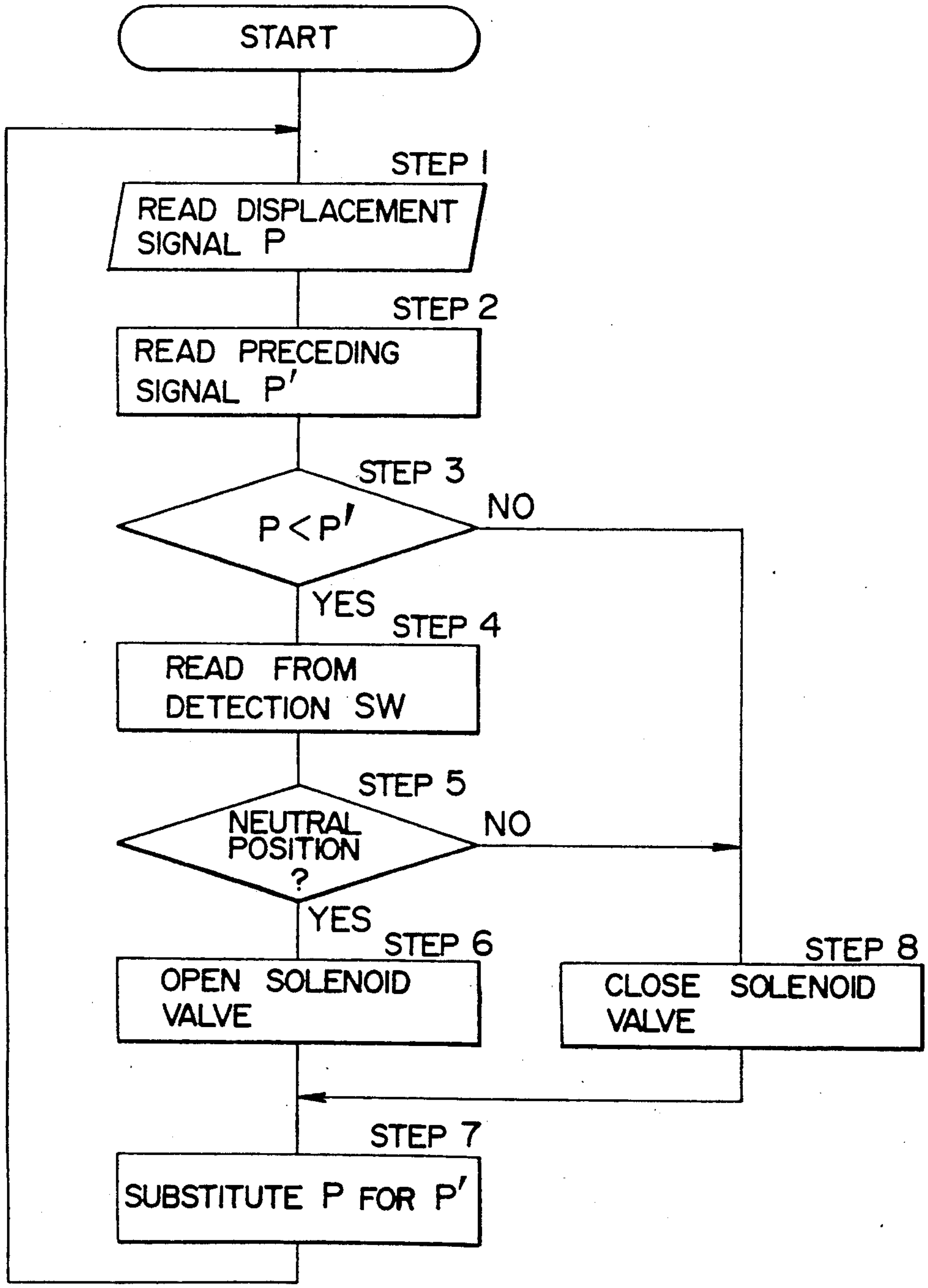
FIG. 17 is a flow chart showing the valve control process executed by a controller in the system of FIG. 16.

The controller 55 is arranged to store the program shown in FIG. 17 in its memory circuit and to execute the process of controlling the operation of the solenoid valve 53. Also, the preceding displacement signal P′ as well as the displacement signal P output from the detecting cylinder 141 is stored in a memory area of the memory circuit of the controller 55. Each time one program cycle is completed, the displacement signal P is substituted for the preceding displacement signal P′ in step 7 of FIG. 17.

The process of the controller 142 to control the operation of the solenoid valve 53 is explained below with reference to FIG. 17.

When the process is started, the controller 142 reads the displacement signal P from the detecting cylinder 141 in Step 1. Then, at Step 2, the controller 142 reads out the preceding displacement signal P′. At Step 3, the controller 141 determines whether or not the displacement signal P is larger than the displacement signal P′. If the answer is "NO" at Step 3, this indicates that the magnitude of the displacement signal P is becoming smaller and the boom 7 is moving downward. The process therefore proceeds to Step 8. At Step 8, the controller 141 continues halting outputting of an operating signal to the solenoid valve 53, thereby holding the solenoid valve 53 at the closed position S shown in FIG. 16. At Step 7, the current displacement signal P is substituted for the preceding displacement signal P′ stored in the memory area and the process which starts with step 1 is resumed as the next program cycle.

If the answer is "YES" at Step 3, this indicates that the displacement signal P is larger than the preceding displacement signal P′, and the process therefore proceeds to step 4. At Step 4, the controller 142 reads the signal output from the neutral-position detecting switch 71 and, at Step 5, determines whether or not the directional selecting valve 16 has been returned to its neutral position N. If the answer is "YES" at Step 5, this indicates that the boom 7 is displaced although the directional selecting valve 16 has been returned to the neutral position N. Such a decision is obtained at the instant when the boom 7 moves downward from point A to point B and switches from fall to rise, for example, at point B as shown by the characteristic line 20 shown in FIG. 21B. Accordingly, the process proceeds to Step 6, where the controller 141 outputs an operating signal to the solenoid valve 53 to switch the solenoid valve 53 from the closed position S to the open position 0.

At the instant when the bottom-side pressure in the bottom-side line 15B, which communicates with the bottom-side hydraulic chamber 10B of the boom cylinder 10, changes from rise to fall as shown by the characteristic line 19 of FIG. 21A, for example, at point B, the solenoid valve 53 releases the bottom-side pressure from the bottoms-side line 15B to the rod-side line 15A through the line 54. The bottom-side pressure abruptly falls as shown by the dotted characteristic line 37 of FIG. 21A. When the bottom-side pressure is decreased to the pressure level of point C, the bottomside line 15B and the rod-side line 15C reach approximately the same pressure. Accordingly, the boom 7 is prevented from oscillating up and down, as shown by the characteristic line 20 of FIG. 21B.

If the answer is "NO" at Step 5, this indicates that the directional selecting valve 16 has been switched from the neutral position N to the switched position R and the boom is moving upward. The process therefore proceeds to step 7. At step 7, the current displacement signal P is substituted for the preceding signal P', and the process which starts with Step 1 is repeated.

In the tenth embodiment, when the boom 7 changes in motion from fall to rise, for example, at point B as shown by the characteristic line 20 of FIG. 21B, the solenoid valve 53 is opened and the bottom-side pressure is released to the rod-side line 15A. Accordingly, as in the previously described embodiments, even if an operator halts the boom 7 during a rapid downward movement thereof, the boom 7 does not vibrate while oscillating up and down. Accordingly, the bucket 9 can be rapidly positioned, whereby it is possible to enjoy various benefits, for example, an improvement in working efficiency.

Figure 18:
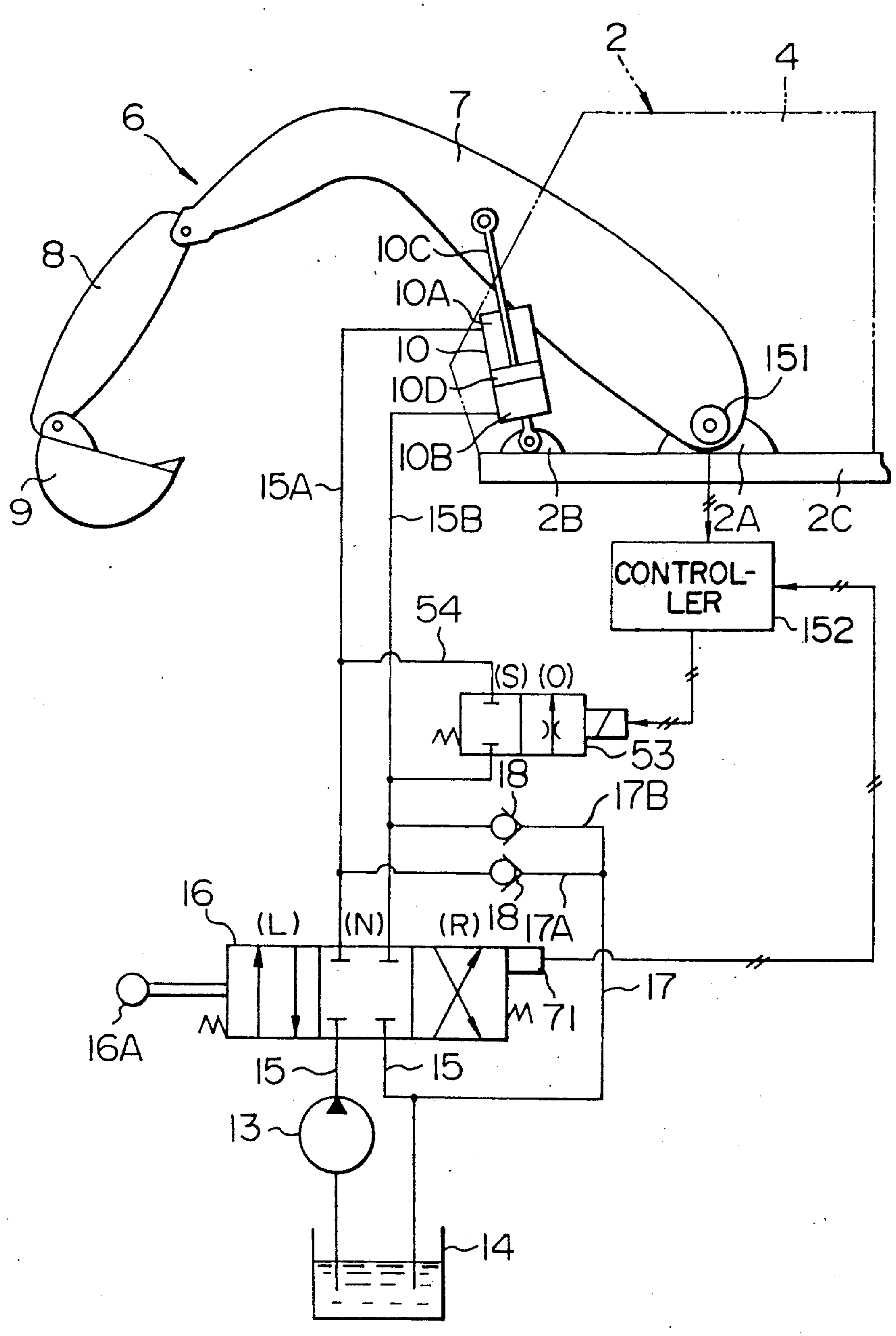
FIG. 18 is a schematic view showing an eleventh embodiment of the present invention.

An eleventh embodiment of the present invention is shown in FIG. 18. The feature of the eleventh embodiment is that an angle sensor 151 is provided at the pin-connection of the boom 7 and the bracket 2A as a displacement sensor for detecting the angle of rotation of the boom 7. The displacement signal P as the rotational-angle signal output from the angle sensor 151 is output to a controller 152 which serves as a control device. The controller 152 has a construction similar to that of the controller 142 explained in connection with the tenth embodiment. The controller 152 executes the process of controlling the operation of the solenoid valve 53 on the basis of a program similar to the program shown in FIG. 17.

The tenth and eleventh embodiments have been explained with reference to the arrangement in which the neutral-position detecting switch 71 is disposed in the directional selecting valve 16. However, such a neutral switch may also be disposed, for example, at the proximal end of the operating lever 16A in the cage 4 as shown in FIG. 11.

The neutral-position detecting switch 71 need not necessarily be incorporated. For instance, the apparatus may be arranged so that, only when the operator is to halt the boom 7 during a rapid downward movement by operating a manual switch, the controllers 142 or 152 may execute the process shown in FIG. 17. In this arrangement, the steps 4 and 5 shown in FIG. 17 may be omitted.

The tenth and eleventh embodiments have been explained with reference to the arrangement in which the solenoid valve 53 is disposed midway along the line 54 which connects the rod-side line 15A and the bottom-side line 15B. Alternatively, the solenoid valve 53 may be disposed midway along a line 168 which connects the bottom-side line 15B and the tank line 17 as shown by the two-dot chain line in FIG. 16. This arrangement also makes it possible to release the bottom-side pressure to the low-pressure side such as the tank line 17, thereby enabling the boom 7 to be stably halted.

Each of the embodiment described above has been explained with reference to the arrangement in which the oscillation-preventing valve or the solenoid valve is opened at the instant when the boom 7 changes its motion from fall to rise and is displaced upwardly, for example, at point B shown in FIG. 21A. However, the present invention is not limited to the above arrangement. For instance, at least while the boom 7 is being displaced upwardly, for example, at point D as shown by the dotted characteristic line 39 of FIG. 21A, the oscillation-preventing valve or the solenoid valve may be opened to release the bottom-side pressure to a line on the low-pressure side.

Although the respective embodiments have been explained with illustrative reference to a hydraulic excavator, the scope of application of the present invention is not limited to the hydraulic excavator only. For instance, the present invention is applicable to a boom-cylinder hydraulic circuit of the type which is used in a working apparatus such as a hydraulic crane arranged to move a boom up and down by means of a boom cylinder.

As is apparent from the above detailed description, the present invention provides the arrangement which, at least while the boom is being displaced upwardly, the bottom-side pressure of the boom cylinder is released into the low-pressure side. Accordingly, even if an operator abruptly halts or steps the boom during a rapid downward movement, the boom does not oscillate up and down and can be stably halted. In addition, since the bucket can be rapidly positioned, it is possible to achieve various benefits, for example, an improvement in working efficiency.

While the invention has been described with reference to the preferred embodiments, this description is solely for the purpose of illustration and is not to be construed as limiting the scope of the invention claimed below. On the contrary, various modifications may be made by those skilled in the art without departing from the true scope and spirit of the invention as defined by the appended claims.

What is claimed is:

1. A hydraulic system for a boom cylinder in a working apparatus which includes a boom mounted pivotally on a body of the working apparatus, comprising:

actuator means for moving said boom up and down, said actuator means including a piston rod connected to said boom and a cylinder defining a rod-side hydraulic chamber and a bottom-side hydraulic chamber for extending or retracting said piston rod;

a hydraulic circuit including directional selecting valve means and lines for respectively connecting said rod-side and bottom-side hydraulic chambers with said directional selecting valve means, said directional selecting valve means selectively switching feed of pressurized working fluid to and discharge of the working fluid from with respect to said rod-side and said bottom-side hydraulic chamber; and means connected to said bottom-side hydraulic chamber of said actuator means through said hydraulic circuit for relieving a pressure in said bottom-side hydraulic chamber to a low-pressure side of said hydraulic circuit when said pressure changes from rise to fall.

2. A hydraulic system according to claim 1, wherein said relieving means includes an oscillation-preventing valve, said valve being provided with a plunger and a valve member, said plunger and said valve member operating together in accordance with a pressure rise in said bottom-side hydraulic chamber, when the pressure in said bottom-side hydraulic chamber changes from rise to fall, said valve member slowly moving away from said plunger to form a channel between said plunger and said valve member, thereby releasing said pressure from said bottom-side hydraulic chamber through said channel.

3. A hydraulic system according to claim 2, wherein said relieving means includes means for detecting whether or not said directional selecting valve means is placed in its neutral position, said oscillation-preventing valve releasing said pressure in said bottom-side hydraulic chamber, in accordance with a detection output from said detecting means, when said directional selecting valve means is returned to said neutral position and said pressure changes from rise to fall.

4. A hydraulic system according to claim 3, wherein said detecting means includes a pair of hydraulic channels formed in said directional selecting valve means and lines each of which connects a corresponding one of said hydraulic channels to said oscillation-preventing valve, said hydraulic channels being formed to provide communication between said rod-side hydraulic chamber and said bottom-side hydraulic chamber via said oscillation-preventing valve when said directional selecting valve means is placed in said neutral position.

5. A hydraulic system according to claim 3, wherein said hydraulic circuit includes a pilot valve for producing pilot hydraulic pressure required to switch said directional selecting valve means, said detecting means including a second change-over valve which operates in accordance with said pilot hydraulic pressure to provide communication between said oscillation-preventing valve and said bottom-side hydraulic chamber when said directional selecting valve is placed in said neutral position.

6. A hydraulic system according to claim 1, wherein said relieving means includes a pressure sensor for detecting said pressure in said bottom-side hydraulic chamber, a controller for determining, on basis of a detection output from said pressure sensor, whether or not said pressure in said bottom-side hydraulic chamber changes from rise to fall, and a solenoid valve operative under control of said controller to provide communication between said bottom-side hydraulic chamber and said low-pressure side of said hydraulic circuit.

7. A hydraulic system according to claim 6, wherein said controller causes said solenoid valve to operate until said pressure in said bottom-side hydraulic chamber detected by said pressure sensor reaches a preset holding pressure required to halt said boom.

8. A hydraulic system according to claim 7, wherein said relieving means further includes angle-sensor means for detecting at least a displacement of said boom, said controller updating said holding pressure in accordance with said displacement of said boom on basis of a detection output from said angle-sensor means.

9. A hydraulic system according to claim 6, wherein said relieving means includes a switch for detecting whether or not said directional selecting valve means is placed in said neutral position, said controller causing said solenoid valve to operate when said directional selecting valve means is returned to said neutral position and said pressure in said bottom-side hydraulic chamber changes from rise to fall, in accordance with a detection output from said controller.

10. A hydraulic system according to claim 1, wherein said relieving means includes means for indirectly detecting a change in the hydraulic pressure in said bottom-side hydraulic chamber, a controller for determining, on basis of the detection output from said detecting means, whether or not said pressure in said bottom-side hydraulic chamber changes from rise to fall, and a solenoid valve operative under control of said controller to provide communication between said bottom-side hydraulic chamber and said low-pressure side of said hydraulic circuit.

11. A hydraulic system according to claim 10, wherein said detecting means includes a switch for sensing whether said directional selecting valve means is placed in said neutral position, when a first predetermined time period elapses after said directional selecting valve means has been returned to said neutral position, said controller causing said solenoid valve to operate for a second predetermined time period immediately after said first predetermined time period.

12. A hydraulic system according to claim 11, wherein first and second predetermined time periods, are each set to an interval equal to approximately a quarter of a specific frequency period of said working apparatus.

13. A hydraulic system according to claim 11, wherein said relieving means includes a flow control valve for limiting an amount of the working liquid which is released from said bottom-side hydraulic chamber through said solenoid valve.

14. A hydraulic system according to claim 10, wherein said relieving means includes a switch for detecting whether or not said direction-switching valve means is placed in said neutral position, said controller causing said solenoid valve to operate, in accordance with a detection output from said switch, when said directional selecting valve means is returned to said neutral position and said pressure in said bottom-side hydraulic chamber changes from rise to fall.

15. A hydraulic system according to claim 14, wherein said detecting means comprises a detecting cylinder which is disposed to operably interconnect said boom and the body of said working apparatus so as to detect displacement of said boom, said controller actuating said solenoid valve when the displacement of said boom exceeds a preceding detected valve.

16. A hydraulic system according to claim 14, wherein said detecting means comprises an angle sensor attached to a pivot-shaft portion of said boom so as to detect displacement of said boom, said controller actuating said solenoid valve when the angular displacement of said boom exceeds a preceding detected valve.

17. A hydraulic system according to claim 1, wherein said relieving means releases the pressure in said bottom-side hydraulic chamber into said line connected to said rod-side hydraulic chamber.

18. A hydraulic system according to claim 1, wherein said hydraulic circuit includes a tank for storing the working liquid to be supplied to said hydraulic circuit, said relieving means releasing the pressure in said bottom-side hydraulic chamber into said tank.

19. A hydraulic system according to claim 1, wherein said hydraulic circuit includes an accumulator, said relieving means releasing the pressure in said bottom-side hydraulic chamber into said accumulator.

20. A hydraulic system according to claim 1, wherein said relieving means includes means for detecting whether or not said directional selecting valve means is placed in said neutral position, said relieving means releasing, on basis of a detection output from said switch, the pressure in said bottom-side hydraulic chamber when said directional selecting valve means is returned to said neutral position and said pressure in said bottom-side hydraulic chamber changes from rise to fall.

* * * * *